United States Patent
Kongo Konde et al.

(10) Patent No.: US 12,345,305 B2
(45) Date of Patent: Jul. 1, 2025

(54) DISC BRAKE COMPRISING AT LEAST ONE ELASTIC RETURN SPRING FOR A BRAKE PAD, ELASTIC RETURN SPRING, REPLACEMENT KIT AND MOUNTING METHOD

(71) Applicant: HITACHI ASTEMO FRANCE, Drancy (FR)

(72) Inventors: Ange Kongo Konde, Angers (FR); Xavier Labarre, Saint Georges du Bois (FR); Didier Esnee, Le Mans (FR); Jean-Louis Bonnec, Les Ponts de Ce (FR); Fabien Chaigneau, Rochefort sur Loire (FR)

(73) Assignee: HITACHI ASTEMO FRANCE, Drancy (FR)

( * ) Notice: Subject to any disclaimer, the term of this patent is extended or adjusted under 35 U.S.C. 154(b) by 317 days.

(21) Appl. No.: 17/596,564

(22) PCT Filed: Jun. 17, 2020

(86) PCT No.: PCT/EP2020/066787
§ 371 (c)(1),
(2) Date: Dec. 13, 2021

(87) PCT Pub. No.: WO2020/260098
PCT Pub. Date: Dec. 30, 2020

(65) Prior Publication Data
US 2022/0252120 A1    Aug. 11, 2022

(30) Foreign Application Priority Data
Jun. 26, 2019 (FR) ..................................... 1906953

(51) Int. Cl.
*F16D 65/54* (2006.01)
*F16D 55/225* (2006.01)
(Continued)

(52) U.S. Cl.
CPC ......... *F16D 65/543* (2013.01); *F16D 55/225* (2013.01); *F16D 65/0978* (2013.01); *F16D 65/0979* (2013.01); *F16D 2125/582* (2013.01)

(58) Field of Classification Search
CPC ............... F16D 65/543; F16D 65/0978; F16D 65/0979; F16D 55/225; F16D 2125/582
See application file for complete search history.

(56) References Cited

U.S. PATENT DOCUMENTS 2,329,688 A * 9/1943 Bedford, Jr. ............ F16B 5/125
24/294
2,533,797 A * 12/1950 Hartman .................. F16B 12/32
24/682.1
(Continued)

FOREIGN PATENT DOCUMENTS

CN    101469748 A * 7/2009 ........... F16D 65/097
CN    108087467 A * 5/2018
(Continued)

OTHER PUBLICATIONS

International Search Report and Written Opinion received for PCT/EP2020/066787, mailed Jul. 21, 2020.
(Continued)

*Primary Examiner* — Vishal R Sahni
(74) *Attorney, Agent, or Firm* — Greer, Burns & Crain, Ltd

(57) ABSTRACT

An elastic return spring for axially returning a brake pad of an automotive disc brake from an active position to an inactive position, the spring being intended to be interposed between the brake pad and a fixed support, with an elastic deformation portion, a carrier portion arranged to be fastened to the fixed support of the disc brake, and a pad portion. The carrier portion includes a support part and a connection part which including at least one connection fold arranged and configured to bear on an anchoring part of the
(Continued)

fixed support and to cooperate with said anchoring part to avoid any lifting of the connection part.

20 Claims, 10 Drawing Sheets

(51) Int. Cl.
*F16D 65/097* (2006.01)
*F16D 125/58* (2012.01)

(56) References Cited

U.S. PATENT DOCUMENTS

| | | | | | |
|---|---|---|---|---|---|
| 2,616,142 | A | * | 11/1952 | Tinnerman | F16B 2/241 |
| | | | | | 24/458 |
| 3,182,367 | A | * | 5/1965 | Hamann | F16B 5/06 |
| | | | | | 411/522 |
| 3,561,799 | A | * | 2/1971 | Hutchinson | F16H 57/0025 |
| | | | | | 411/948 |
| 4,463,837 | A | * | 8/1984 | Courbot | F16D 65/0977 |
| | | | | | 188/73.38 |
| 4,699,254 | A | * | 10/1987 | Mery | F16D 55/2265 |
| | | | | | 188/73.38 |
| 9,862,362 | B2 | * | 1/2018 | Kaneko | F16D 55/226 |
| 10,030,729 | B2 | * | 7/2018 | Foucoin | F16D 65/543 |
| 2001/0032757 | A1 | | 10/2001 | Ballinger et al. | |
| 2009/0166135 | A1 | * | 7/2009 | Sano | F16D 65/0978 |
| | | | | | 188/71.8 |
| 2009/0277729 | A1 | * | 11/2009 | Kim | F16D 65/0977 |
| | | | | | 188/73.38 |
| 2014/0048360 | A1 | | 2/2014 | Plantan et al. | |
| 2016/0102721 | A1 | * | 4/2016 | Foucoin | F16D 65/543 |
| | | | | | 188/196 R |
| 2018/0051760 | A1 | * | 2/2018 | Foucoin | F16D 65/0979 |
| 2022/0205500 | A1 | * | 6/2022 | Petri | F16D 55/22 |

FOREIGN PATENT DOCUMENTS

| | | | | |
|---|---|---|---|---|
| DE | 102016004720 A1 | | 2/2017 | |
| EP | 2420691 A1 | * | 2/2012 | ......... F16D 65/0018 |
| EP | 2141380 B1 | * | 1/2017 | ......... F16D 65/0972 |
| FR | 3004500 A1 | | 10/2014 | |
| FR | 3027080 A1 | | 4/2016 | |
| FR | 3033012 A1 | * | 8/2016 | ........... F16D 55/227 |
| GB | 1572888 A | * | 8/1980 | .............. F16B 9/023 |
| JP | 02-092148 U | | 7/1990 | |
| JP | 2000220670 A | * | 8/2000 | |
| JP | 2007315577 A | * | 12/2007 | |
| JP | 2020090969 A | * | 6/2020 | |
| WO | WO-2019243933 A1 | * | 12/2019 | ......... F16D 65/0978 |
| WO | WO-2019243936 A1 | * | 12/2019 | ......... F16D 55/2265 |
| WO | WO-2020109693 A1 | * | 6/2020 | ........... F16D 65/543 |
| WO | WO-2020109728 A1 | * | 6/2020 | ........... F16D 65/543 |

OTHER PUBLICATIONS

French Search Report received for Application No. 1906953, dated Feb. 12, 2020.

* cited by examiner

Fig.15e
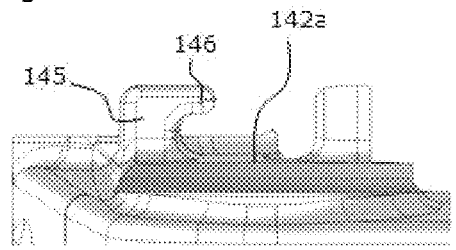
Fig.15f
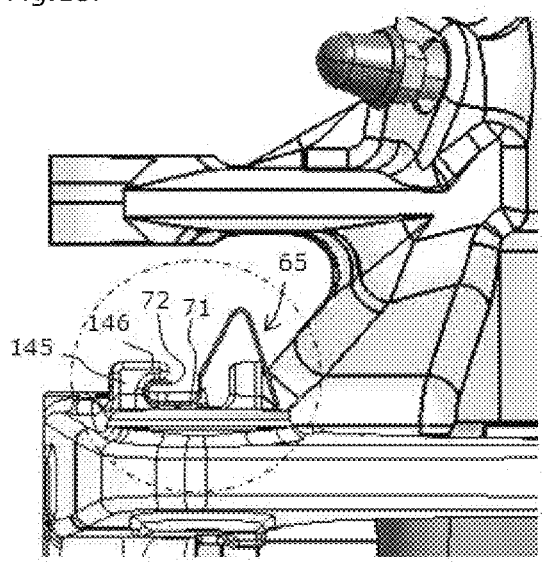
Fig.16
Fig. 16a
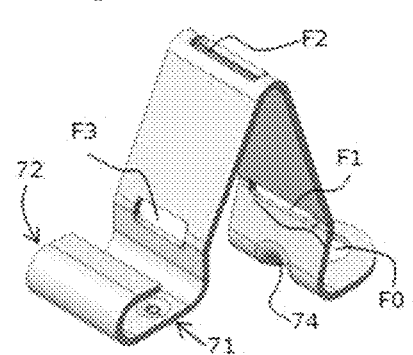
Fig. 16b
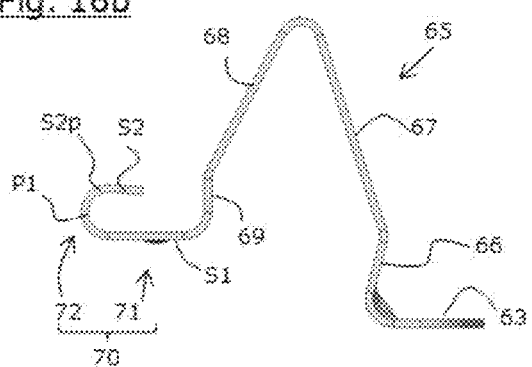

DISC BRAKE COMPRISING AT LEAST ONE ELASTIC RETURN SPRING FOR A BRAKE PAD, ELASTIC RETURN SPRING, REPLACEMENT KIT AND MOUNTING METHOD

BACKGROUND

The present invention relates to a disc brake comprising at least one elastic return spring for a brake pad, an elastic return spring and a mounting method for said elastic return spring. The field of the invention is that of brake systems for motor vehicles.

The invention proposes an axial elastic return spring of a brake pad comprising means for compensating, by plastic deformation, for the wear play of a friction brake lining of the brake pad. The invention proposes an axial elastic return spring for axially returning a brake pad of a disc brake, from an active position to an inactive position, said spring being intended to be interposed between the brake pad and a fixed support, said spring comprising an elastic deformation portion, a carrier portion arranged to be fastened to the fixed support of the disc brake, and a pad portion. The carrier portion comprises a support part and a connection part comprising at least one connection fold arranged and configured to press on an anchoring part of the fixed support, and to cooperate with said anchoring part to prevent lifting of said connection part.

The disc brakes of motor vehicles generally comprise:
- a brake disc which extends in a plane transverse to the axial orientation axis of rotation of said disc, an "axial" orientation here meaning an orientation which is parallel to the axis of rotation of the wheel and of the disc,
- a support, called carrier, that is fixed with respect to a frame of the vehicle,
- an element that is fixed in rotation, called caliper, which is held by the carrier and which covers the disc over a portion of its periphery,
- at least one pair of brake pads, each of which comprises a friction brake lining, a friction face of which cooperates with an associated braking track carried by one of the faces of the disc.

Such a brake pad is mounted sliding axially, in a housing carried by the carrier, between an active position, called "forward" position, in which said friction face is pressing against the associated annular track of the disk, and an inactive position, called "withdrawn" position, in which said friction face is axially moved away from said associated annular track of the disc by a determined working play. The two pads of such a pair of brake pads or linings are arranged inside the arms of the caliper, on either side of the disc and facing one another.

To perform the braking, one or more pistons housed in the caliper move towards the disc to apply a clamping force which brings the pads of one and the same pair closer to each other, which leads them to rub on the friction tracks surfaces of the disc and thus to slow its rotation. On their periphery, the pads are each typically equipped with two lugs which pass into a plane parallel to the disc and are arranged in two positions that are substantially opposite, each lug sliding axially in the housing arranged in the carrier.

When pressed on by the piston or pistons, the sliding of the brake pads to their active position brings them closer to one another. The two brake pads then tightly grip the disc and thus apply a brake torque to it, which slows the disc rotation. The braking operation is thus an operation which can be called "active", because it is caused by an actuator (the piston).

When the piston is no longer pressing on them, the brake pads are repelled to their inactive position, by the disc in rotation and by the elasticity of the seal which surrounds the piston. It is therefore an operation qualified here as "passive", occurring naturally under the effect of pre-existing stresses.

However, it may be that the disc does not repel the brake pads with sufficient force to move them far enough away from the disc. This can happen for example when the sliding of the brake pads is of insufficient quality, or seized.

Although the brake pads are no longer actively clamped against the disc, each of the annular tracks of the latter nevertheless continuously rubs against the friction brake lining carried by the associated brake pad. The friction brake linings thus undergo premature non-operational wear, which increases noise and the emission of dust. In addition, this continuous rubbing is capable of causing a heating that may damage certain elements of the disc brake.

This continuous rubbing also produces a residual torque which opposes the rotation of the disc. This increases the vehicle's consumption, while reducing its performance.

It has therefore been proposed to interpose, between the carrier and a brake pad, at least one spring which produces an elastic return of the brake pad to its inactive position.

In order to solve these problems of unnecessary wear and heating, document FR 3 004 500 A1, illustrated here in FIG. 1, proposes a disc brake in which an elastic return spring (48) comprises a part which deforms plastically when the travel of the brake pad is greater than the working play. This plastic deformation therefore modifies the rest position of the pad, thus producing a wear compensation.

This elastic return spring has the form of a blade folded into several parts with an axial orientation, and connects the fixed support (14) of the disc brake and one of the brake pads (18). One end of the spring is fastened to the edge of the pad. The other end has an axial orientation and slides into a notch in the carrier, in the form of a groove having an axial orientation, at the bottom of the slide housing of the pad.

According to another design, known from document FR 3 027 080 A1 and illustrated here in FIG. 2, a fastening part (50) of the elastic return spring (48) on the fixed support is constituted by a tab (52) which extends in a plane orthogonal to the direction of axial sliding of the brake pad, and which comprises a through hole so as to fasten said spring by riveting on the carrier which constitutes the fixed support.

According to yet another design, known from document FR 3 033 012 A1 and illustrated here in FIG. 3, the part for fastening the elastic return spring on the fixed support forms a similar fastening tab (52) which is provided to be fastened on a pin (350F) having an axial orientation, axially force-fitted in a complementary hole formed in the fixed support. This fixing tab (52) comprises an orifice (53) equipped with an inner toothing (366), which deforms elastically when it is mounted by axial fitting on the pin, then axially retains the head of the pin by over-centering with this inner toothing.

However, it is still desirable to facilitate the mounting and to lower the manufacturing cost, while preserving or improving the stabilization of the return force.

Another aim of the invention is to reduce the duration and/or intensity of residual braking, while keeping or improving the simplicity and the reliability of manufacture, maintenance and operation.

SUMMARY

According to a first aspect, the invention proposes an axial elastic return spring for axially returning a brake pad of a disc brake from an active braking position to an inactive position. The spring is intended to be interposed between the brake pad and a fixed support of the disc brake. Said spring comprises:

- an elastic deformation portion, arranged to produce a reaction force during pressing of said pad in the active position, so as to return said brake pad to the inactive position in axial translation,
- a carrier portion arranged to be fastened on the fixed support of the disc brake, and which is integral with the deformation portion,
- a pad portion arranged to be fastened to the brake pad, in the form of a fastening tab, which is integral with the deformation portion and which extends in a plane orthogonal to the direction of axial sliding of the brake pad.

According to the invention, the carrier portion comprises a support part having a first support section which:

- is integral with the deformation portion,
- extends in a plane orthogonal to the direction of axial sliding of the brake pad, for example by means of a flat face or at least one area of linear contact comprised in such a plane, and
- is arranged to press axially on the fixed support under the effect of the deformation of the spring when the pad leaves its inactive position.

Moreover, the carrier portion comprises a connection part comprising at least one connection fold arranged and configured to press on an anchoring part carried by a transverse face of the fixed support, and cooperate with said anchoring part to prevent lifting of said connection part.

The spring according to the invention makes it possible to move the pad away from the disc when the piston no longer presses on it, and thus to reduce the duration and/or intensity of the residual braking, while facilitating its mounting, lowering the manufacturing cost, simplifying its structure and manufacture, and improving the optimization compromises in terms of manufacture, mounting and reliability.

By "active position" of a brake pad is meant a position, called forward position, in which the friction face of said pad presses against the associated annular track of the brake disc. By "inactive position" of a brake pad is meant a position, called withdrawn position, adopted by the pad when the brake is not actuated and in which said friction face is axially moved away from said associated annular track of the brake disc by a predetermined working play.

By "axial direction" is meant, in particular in respect of an axial sliding or an axial pressing, a direction parallel to the axis of rotation of a brake disc.

By "transverse direction" is meant (except with reference to the folds of the spring) a direction that is transverse to the axis of rotation and thus parallel to the plane of the disc and orthogonal to the axis of rotation of this disc. Thus, a transverse face of the fixed brake support will be a face of this fixed support that is substantially parallel to the plane of the disc, for example forming an angle of less than 10° or 20° with this plane.

By "radial direction" is meant a direction forming a radius of the rotation of the disc around this axis, i.e. passing through the axis of rotation of the disc and perpendicular to this axis, or forming a slight angle with such a radius, of less than 45° or even of less than 20° or 10°. A tangential direction is defined, at a given point, as a direction tangential to a rotation of this point which will be produced around the axis of rotation of the disc, or forming a slight angle with such a tangent, of less than 45° or even of less than 20° or 10°.

By "peg" is meant a part or a shape projecting from a given surface, such as to be able to be housed in a groove or a recess.

The axial elastic return spring is preferably in the form of an elongated band, for example rectangular, comprising several transverse folds so as to form the different portions or parts of the spring. By "portion or part of the spring" is meant one or more consecutive spring sections within said band; a spring section being delimited by two consecutive folds.

Preferably, the elastic deformation portion is an elastic and plastic deformation portion, arranged to undergo an elastic deformation that produces a reaction force, during pressing of said brake pad, so as to return said brake pad translationally to the inactive position, said reaction force being maintained substantially constant during wear of the pad under the effect of a plastic deformation being produced in said spring beyond a determined amplitude of said deformation. The reaction force is an elastic return force when the pad is pressed against the brake disc by the piston of the caliper. When the pressing travel of the brake pad, i.e. its travel between the inactive position and the active position, increases until it exceeds a predetermined elastic working play and thus a determined bending stress, the deformation portion deforms plastically, which modifies its resting shape, so as to reduce said travel and thus to keep it substantially equal to the predetermined elastic working play. This elastic working play is thus stabilized at a value that is substantially constant during the life of the pad, despite its wear.

The elastic and plastic deformation portion thus makes it possible to compensate for the effect of the wear of the lining of the brake pad, and to prevent the return force from being increased under the effect of this wear.

According to a first family of embodiments of the spring, the connection part comprises a second connection section, a proximal end of which is connected to the first support section by at least one connection fold, the folding axis of which is orthogonal to the axial direction of the displacement of the brake pad. The second connection section extends substantially parallel to the first support section so as to be able to be inserted under a projection of the anchoring part in the form of a peg, and thus prevent lifting via an axial pressing applied under said projection. The contact between the connection part of the spring and the anchoring part of the fixed support is substantially linear or areal.

Preferably, the projection projects in a direction which is orthogonal to both the axial direction of the displacement of the brake pad and the folding axis of the spring.

This arrangement makes it possible to facilitate the placement and the holding in position of the elastic return spring.

According to a second family of embodiments of the spring, the connection part comprises at least three connection sections:

- a second lateral connection section, a proximal end of which is connected to the first support section by a connection fold, the folding axis of which is orthogonal to the axial direction of the displacement of the brake pad,
- a third connection section, a proximal end of which is connected to the second lateral connection section by a connection fold, the folding axis of which is orthogonal to the axial direction of the displacement of the brake pad,
- a fourth lateral connection section comprising a distal end, and a proximal end connected to the third section by a connection fold, the folding axis of which is orthogonal to the axial direction of the displacement of the brake pad.

The at least three connection sections and/or the three folds are arranged to substantially form a "U", so that the connection part can fit on the anchoring part in the form of a peg, and thus prevent lifting by a pinching of said peg.

In this embodiment, the anchoring part is in the form of a peg, which may present a projection or not.

Moreover, the connection folds can be only elastically deformable, or can be elastically and plastically deformable.

For example, the second and fourth lateral connection sections are substantially straight and perpendicular to the first support section so as to form a straight "U".

According to another example, the connection folds, in particular those located close to the proximal and distal ends of the third connection section, are elastically deformable. The second and/or fourth lateral connection sections are inclined or curved such that the distance between the proximal end of the second connection section and the distal end of the fourth connection section is less than the length of the third connection section, so as to be in the shape of an omega or half omega, for example as two symmetrical "S"s facing one another. This characteristic makes it possible to pinch the base of the anchoring part in the form of a peg. This pinching thus produces a lateral pressing that cooperates with the pinched surfaces, by rubbing and/or engagement, to provide an axial anti-lifting force.

Preferably, the connection part comprises studs projecting in the direction of a lateral connection section. According to an embodiment, the lateral connection sections having studs projecting in the direction of the opposite connection section. The studs produce elastic clamps provided to grip the anchoring part, for example by over-centering. Preferably, the connection sections have "U"-shaped cut-outs so as to produce the studs. The studs make it possible to facilitate the holding in position of the connection part of the spring on the anchoring part of the fixed support.

In the context of the second embodiment of the spring, the connection part can comprise a fifth connection section comprising a distal end, and a proximal end connected to the fourth section by a connection fold, the folding axis of which is orthogonal to the axial direction of the displacement of the brake pad.

The fifth connection section makes it possible to press on the fixed support and to facilitate the clipping of the connection part on the anchoring part of said fixed support, and/or to facilitate holding in position of the connection part of the spring on the anchoring part of the fixed support.

For example, the fifth section extends in a direction opposite to that of the first support section, thus facilitating for example a clipping of the connection part on the anchoring part. According to another example, the fifth section extends substantially in the direction of the first support section, forming for example a clamp facilitating the gripping to the wall of the anchoring part and/or under an excrescence of the latter.

According to the first or second embodiment of the spring, the latter is produced in a single part by cutting and forming a sheet or a strip of material, for example by stamping and folding, for example of constant width. For example, the spring is made from steel.

Optionally, the spring comprises at least one rib arranged through a fold and/or between two consecutive folds. By "rib" is meant an excrescence projecting in order to locally increase the resistance or mechanical rigidity. For example, the rib can be produced by stamping of the spring.

According to a second aspect, the invention proposes an assembly comprising a brake pad and an axial elastic return spring according to one or more of the characteristics described in the first aspect of the invention. According to the second aspect of the invention, the pad portion of the axial elastic return spring is fastened to the brake pad in a non-removable manner. For example, the spring can be riveted or welded to the brake pad. The spring can also be fitted by force.

Preferably, the assembly comprises a brake pad and two axial elastic return springs paired with said brake pad.

According to a third aspect, the invention proposes a fixed support for the brake caliper of a disc brake of a motor vehicle, in which the support has an anchoring part in the form of a peg projecting axially from a pressing face of the fixed support, which is preferably in a plane parallel to the disc. Such a peg is for example produced in the form of a rib projecting from the pressing face. The anchoring part in the form of a peg is moulded in a single part with said fixed support so as to be able to receive and cooperate with the carrier portion of an axial elastic return spring according to the first aspect of the invention, or of the axial elastic return spring of an assembly according to the second aspect of the invention.

Preferably, the fixed support has an anchoring part carried by a transverse face of said fixed support and comprises at least one projection projecting transversely. The projection is moulded in a single part with said fixed support so as to be able to receive and cooperate with the carrier portion of an axial elastic return spring according to the first aspect of the invention, or of the axial elastic return spring of an assembly according to the second aspect of the invention.

According to a fourth aspect, the invention proposes a disc brake for a motor vehicle comprising:
  a disc brake which extends in a plane transverse to an axial orientation axis of rotation of the brake disc,
  a support fixed with respect to a frame of the vehicle, said support being arranged according to the third aspect of the invention,
  at least one brake pad mounted sliding axially, in the fixed support, between an active position, in which the at least one brake pad presses against the associated braking track of the brake disc, and an inactive position, in which the at least one brake pad is axially moved away from said braking track by a non-zero working play,
  at least one axial elastic return spring, according to the first aspect of the invention, mounted in a removable manner with respect to the fixed support between the at least one brake pad and the fixed support so as to exert a return force of said at least one brake pad towards its inactive position,
  a brake calliper arranged and configured to be held by the fixed support and act on the at least one brake pad towards its active position.

According to a fifth aspect, the invention proposes a method for mounting at least one axial elastic return spring, according to the second embodiment of said spring of the first aspect of the invention, on a fixed support according to the third aspect of the invention, said method comprising the steps consisting of:
  mounting a brake pad in or on a fixed support,
  mounting said axial elastic return spring by axially fitting by clipping the connection part on the anchoring part in the form of a peg carried by the fixed support.

According to a sixth aspect, the invention proposes a method for mounting at least one axial elastic return spring, according to the first embodiment of said spring of the first aspect of the invention, on a fixed support comprising an anchoring part equipped with a transverse projection, according to the third aspect of the invention, said method comprising the steps consisting of:
    mounting a brake pad in or on a fixed support,
    mounting said axial elastic return spring by transversely inserting the connection part of said spring under the projection of the anchoring part of the fixed support opposite the brake pad.

BRIEF DESCRIPTION OF THE DRAWINGS

Other features and advantages of the invention will become apparent from the detailed description of an embodiment mode which is in no way limitative, and the attached drawings, in which:

FIG. 1 being an exploded perspective view of a disc brake comprising two springs, each comprising an end having an axial orientation, FIG. 2 being a perspective view of a spring comprising an end extending in a plane orthogonal to the direction of axial sliding of a brake pad, said end comprising a through hole, FIG. 3 being a perspective view of assembling of a spring comprising an end extending in a plane orthogonal to the direction of axial sliding of a brake pad, said end comprising an orifice equipped with an inner toothing;

FIG. 4a showing the brake on the wheel side,

FIG. 4b showing the brake on the frame side;

FIGS. 5a, 5b, 6a, 6b, 7a, 7b, illustrate three embodiments of a fixed brake support, in particular according to the first family of embodiments of springs, each end of the fixed support comprising an anchoring part in the form of a peg:

FIG. 5a being a perspective view of a fixed support showing a first embodiment of the anchoring part projecting axially and which has a transverse cross-section that is substantially constant in the axial direction, FIG. 5b being a view from above of an end of a fixed support showing an anchoring part according to the first embodiment, FIG. 6 comprising FIG. 6a and FIG. 6b, FIG. 6a being a perspective view of a fixed support showing a second embodiment of the anchoring part projecting axially and which has a transverse projection from the axial end of the anchoring part, FIG. 6b being a view from above of an end of a fixed support showing an anchoring part according to the second embodiment, FIG. 7 comprising FIG. 7a and FIG. 7b, FIG. 7a being a perspective view of a fixed support showing a third embodiment of the anchoring part projecting axially and which has two opposing transverse projections from the axial end of the anchoring part, FIG. 7b being a view from above of an end of a fixed support showing an anchoring part according to the third embodiment;

FIGS. 8a, 8b, 9a, 9b, 10a, 10b, 11a, 11b, 12a, 12b, 12c, 12d, 13a, 13b, 14a, 14b illustrate seven embodiments of an axial elastic return spring, according to a first family of embodiments of springs, each being arranged to cooperate with one or more fixed supports according to FIGS. 5a, 5b, 6a, 6b, 7a, 7b:

FIGS. 8a, 9a, 10a, 11a, 12a, 13a, 14a being perspective views of a spring, FIGS. 8b, 9b, 10b, 11b, 12b, 13b, 14b being profile views of a spring, showing from right to left: a pad portion, a deformation portion and a carrier portion, the carrier portion comprising a support part and a connection part, FIG. 8 comprising FIG. 8a and FIG. 8b, FIG. 8a being a perspective view of a spring according to a first embodiment in which the connection part is in the shape of a "U".

FIG. 8b being a profile view of a spring according to the first embodiment,

FIG. 9a being a perspective view of a spring according to a second embodiment in which the connection part is in the shape of an "R".

FIG. 9b being a profile view of a spring according to the second embodiment,

FIG. 10a being a perspective view of a spring according to a third embodiment in which the connection part is in the shape of an omega, FIG. 10b being a profile view of a spring according to the third embodiment, FIG. 11 comprising FIG. 11a and FIG. 11b, FIG. 11a being a perspective view of a spring according to a fourth embodiment in which the connection part is in the shape of an omega and comprises two ribs, FIG. 11b being a profile view of a spring according to the fourth embodiment, FIG. 12 comprising FIG. 12a, FIG. 12b, FIG. 12c and FIG. 12d, FIG. 12a being a perspective view of a spring according to a fifth embodiment in which the connection part is in the shape of an omega and comprises cut-out studs, FIG. 12b being a profile view of a spring according to the fifth embodiment, FIG. 12c showing assembling of a connection part of a spring according to FIGS. 12a and 12b with an anchoring part according to FIGS. 5a and 5b, FIG. 12d being a perspective view of a connection part of a spring according to FIGS. 12a and 12b, FIG. 13 comprising FIG. 13a and FIG. 13b, FIG. 13a being a perspective view of a spring according to a sixth embodiment in which the connection part is in the shape of an omega, FIG. 13b being a profile view of a spring according to the sixth embodiment, FIG. 14 comprising FIG. 14a and FIG. 14b, FIG. 14a being a profile view of a spring according to a seventh embodiment in which the connection part is in the shape of an omega and comprises an overwrap, FIG. 14b being a profile view of a spring according to the seventh embodiment.

FIG. 15a showing the disc brake on the wheel side,

FIG. 15d showing the disc brake on the frame side,

FIGS. 15b and 15c are views from above of an end of the fixed support according to FIG. 15a:

FIG. 15b being a view from above of an end of the fixed support according to FIG. 15a comprising an anchoring part in the form of a peg projecting axially and which has a transverse projection from the axial end of the anchoring part, FIG. 15c showing assembling the anchoring part according to FIG. 15b with a spring according to a second family of embodiments of springs, FIGS. 15e and 15f are views from below of an end of the fixed support according to FIG. 15d:

FIG. 15e showing the fixed support comprising an anchoring part in the form of a peg projecting axially and which has a transverse projection from the axial end of the anchoring part, FIG. 15f showing assembling the anchoring part according to FIG. 15e with a spring according to a second family of embodiments of springs, FIG. 16 comprising FIG. 16a and FIG. 16b, FIG. 16a is a perspective view of the axial elastic return spring, according to the second family of embodiments of springs, being arranged to cooperate with one or more fixed supports according to FIG. 15b or 15e, FIG. 16b is a profile view of the spring according to FIG. 16a, showing from right to left: a pad portion, a deformation portion and a carrier portion, the carrier portion comprising a support part and a C-shaped connection part.

DETAILED DESCRIPTION

Figure 1:
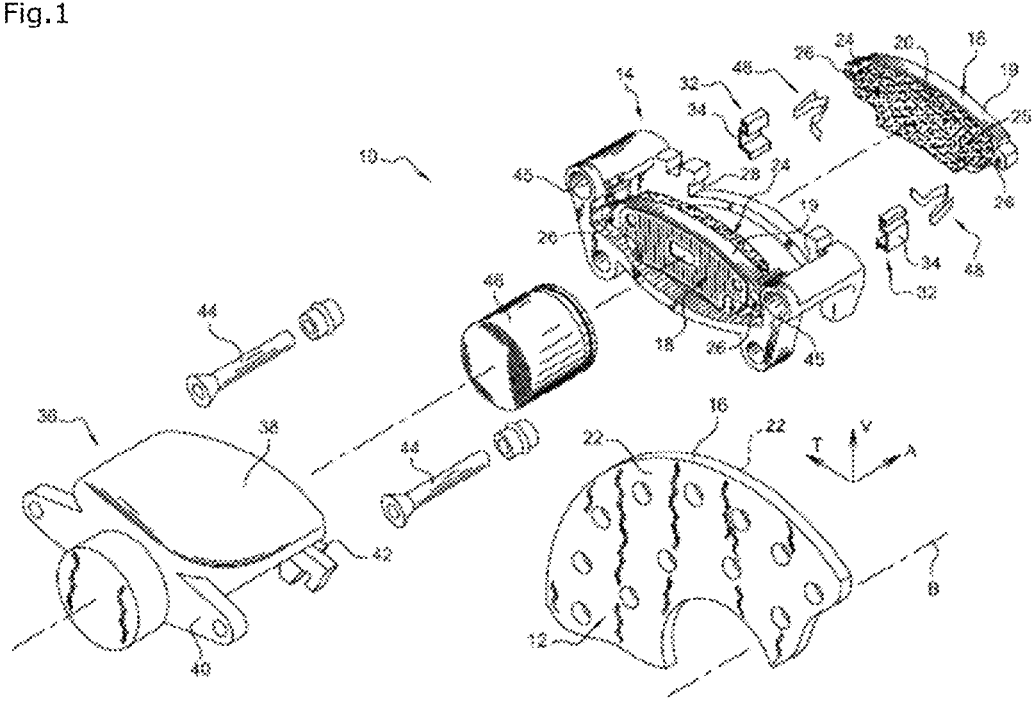
FIGS. 1, 2 and 3 are views of different elastic return springs of the prior art.

Different directions are defined here with respect to the axis of the wheel being braked: an "axial" direction A is a direction parallel to this axis. In the context of a disc brake shown here, for the sake of simplification, it will be considered that the mechanism that grips the disc occupies a region located on the periphery of the disc and occupies a restricted angular segment. In this region, a "radial" direction R will thus be a direction which approaches the axis of the disc, while a "tangential" direction T will be a direction which is substantially parallel to the displacement of the disc in its area of contact with the pad.

By "transverse direction" is meant (except with reference to the folds of the spring), in particular relating to a transverse face of a fixed brake support or a transverse pressing, a direction parallel to the plane of the disc. The tangential direction T and the radial direction R are both transverse directions. The three directions, axial, radial and tangential, are here shown diagrammatically by a trihedron A, R, T.

FIGS. 4a, 4b, 15a, 15d illustrate a motor vehicle disc brake 100 of the sliding calliper type. In a known manner, the disc brake comprises a brake disc (not shown) which is mounted rotating around an axis of rotation having an axial orientation A. The brake disc is rotationally integral with a wheel (not shown) of the motor vehicle.

The disc brake 100 comprises a fixed support 140, also called carrier, which is mounted fixed with respect to the frame (not shown) of the vehicle. The fixed support 140 comprises two pairs of limbs intended to straddle a peripheral segment of the brake disc. The fixed support 140 comprises two outer or forward limbs 142 connected to one another to form a "U"; and two inner or rear limbs 141 connected to one another to form a "U" and which are fastened to the suspended part of the frame by two bores. These limbs extend substantially radially along the segment of the brake disc. Each outer limb 142 is connected to an inner limb 141 via an axial beam 143 which straddles the periphery of the disc. These beams 143 are arranged to receive the calliper according to an axial sliding link, and here each have a hollow form (not visible because it opens on the side of the rear limbs 141) which is intended to receive a sliding post (not shown) of the brake calliper.

Figure 4A:
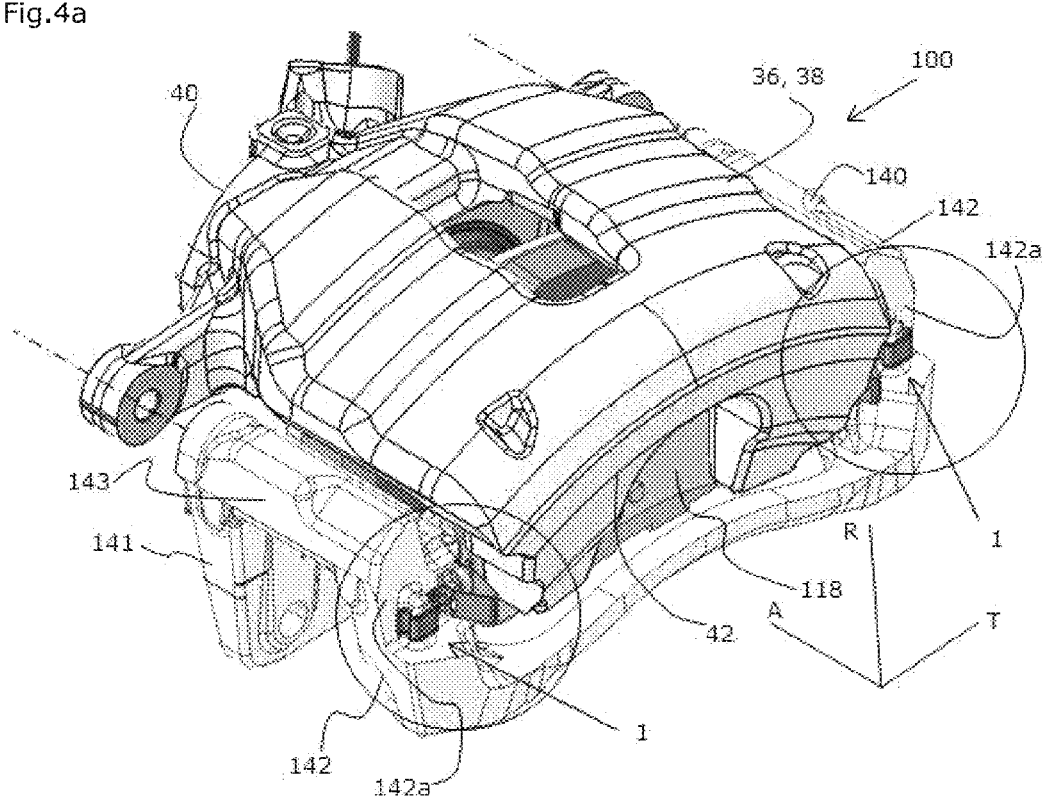
FIGS. 4a and 4b are perspective views of a disc brake comprising two axial elastic return springs, according to a first family of embodiments, arranged on either side of a brake pad, each spring being on the one hand fastened to an end of a brake pad, and on the other hand connected to the fixed support of the brake by fitting.
Figure 4B:
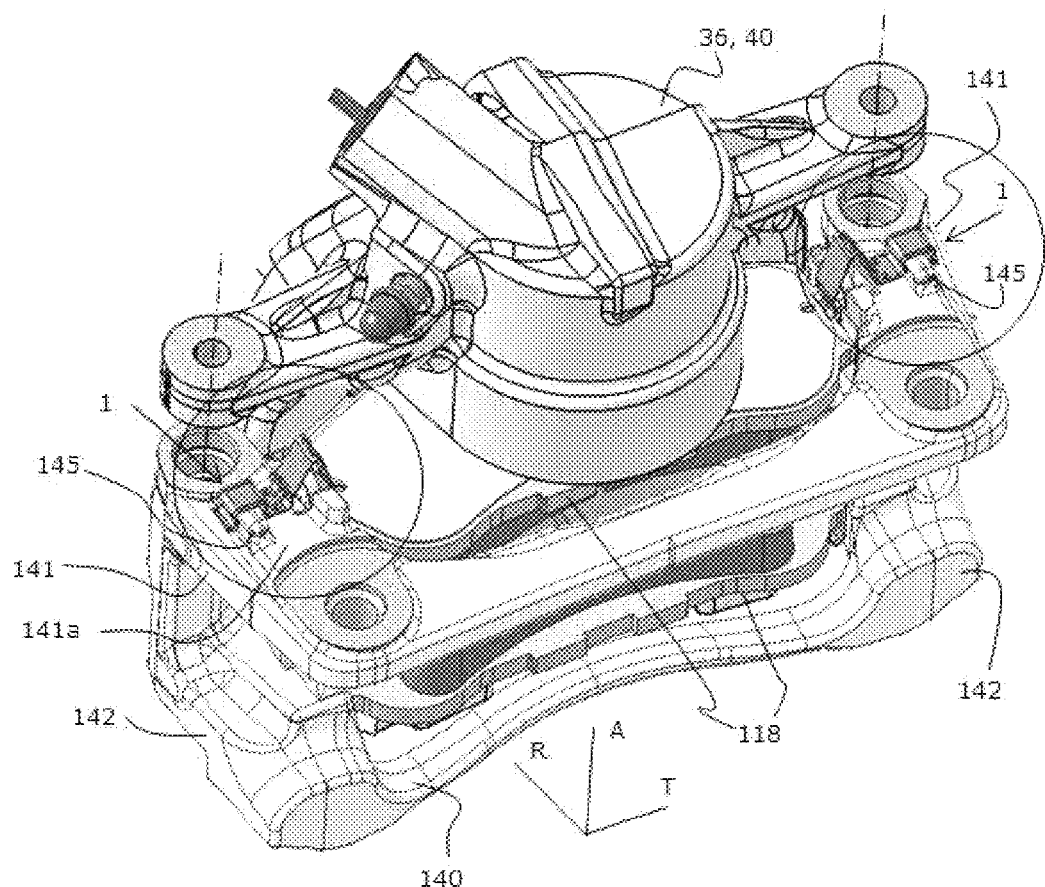

The disc brake 100 also comprises two opposite brake pads 118 (FIG. 4b), called rear and forward (also called inner and outer or frame side and wheel side), mounted sliding axially in the fixed support 140 on either side of the brake disc. With reference to FIG. 4b, the brake pad 118 is in the form of a transverse plate acting as a support for the friction brake lining. The two brake pads 118, rear and forward, most often have a structure and an arrangement on the fixed support 140 which are symmetrical to one another around a median transverse plane, in general vertical with respect to the road.

Figure 5:
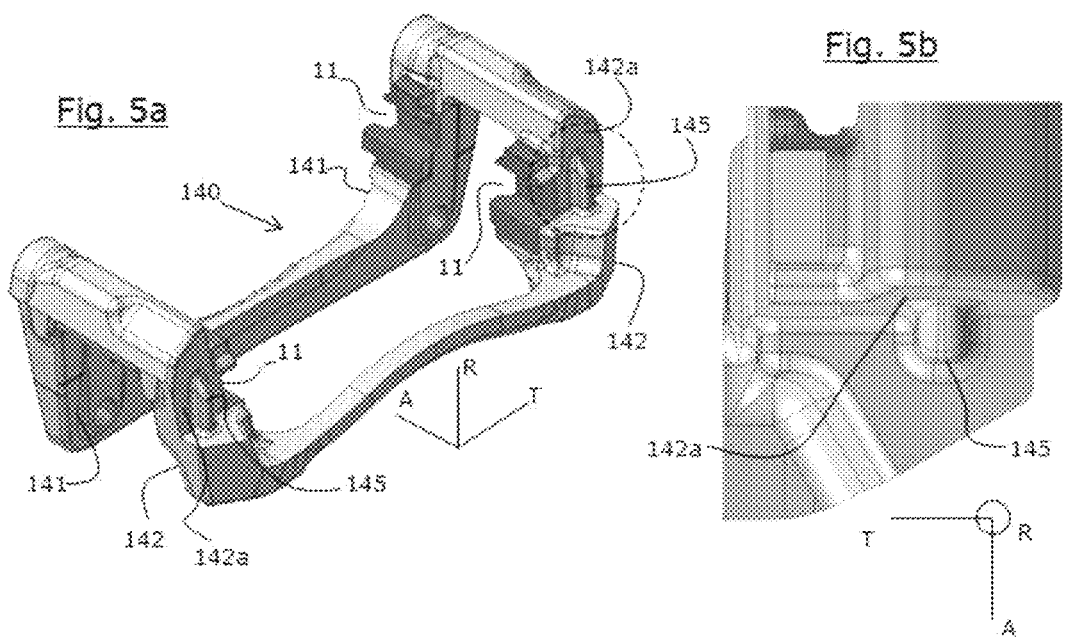
FIG. 5 comprising FIG. 5a and FIG. 5b.
Figure 6:
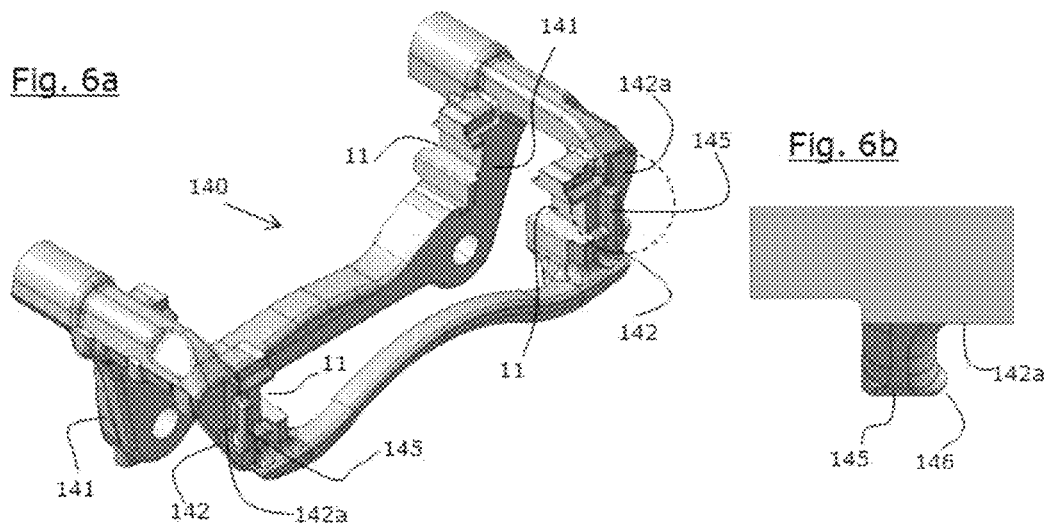
Figure 7:
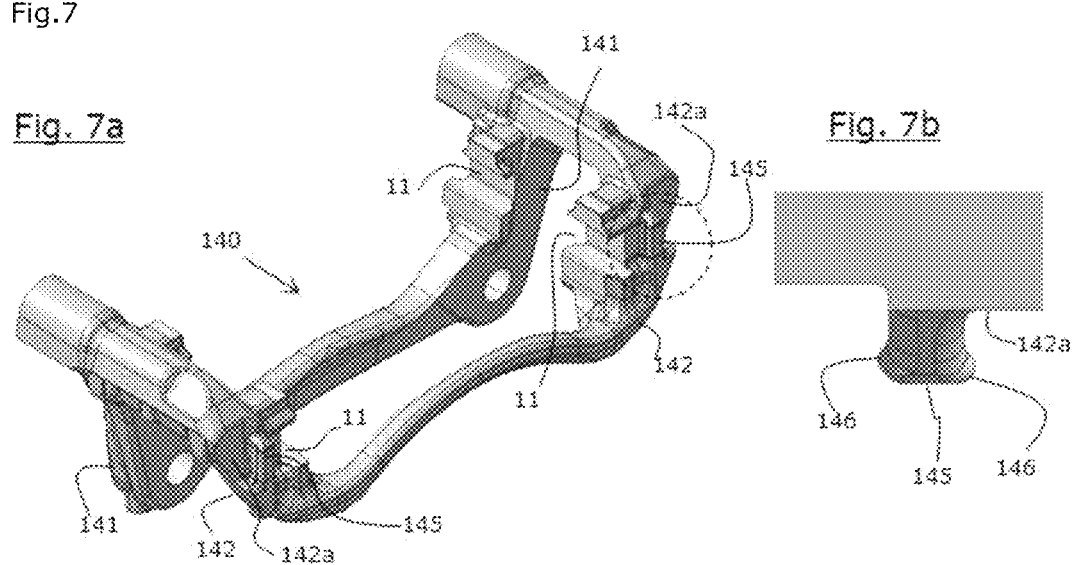

With reference to FIGS. 5a, 6a and 7a, the fixed support 140 comprises four pad housings 11 arranged in the four limbs, on their face and facing their pad (two housings are visible in the figures). These housings 11 are arranged and configured to receive a brake pad in a rotationally fixed and axially sliding manner. The brake housings 11 are arranged so as to receive the longitudinal ends of the two brake pads or "lugs", and guide them in their axial translation.

The disc brake 100 comprises a brake calliper 36 comprising two arms intended to straddle a segment of the brake disc with an arm on each side of the disc. The calliper 36 comprises an arch 38 which extends axially above the fixed support 140, covering it and straddling the disc, and two rear 40 and forward 42 arms which extend radially from the rear and forward ends of the arch 38 towards the axis of rotation of the brake disc. The forward arm 42 extends opposite the forward brake pad 118, which it holds, to the disc (see FIG. 4a), and the rear arm 40 extends opposite the rear brake pad 118, which it holds, to the disc (see FIG. 4b). The inner or rear arm 40 comprises a piston cylinder arranged and configured to receive an axial brake piston (not shown) mounted sliding and a transverse pressing face of which is arranged facing the support plate of the rear brake pad 118 (frame side). The brake piston is arranged to cooperate with said inner brake pad 118 in order to apply the pad lining against an inner face of the brake disc, for example, but not necessarily, under the effect of a hydraulic pressure.

The calliper 36 is here mounted axially sliding with respect to the fixed support 140 via two parallel guide posts (shown only by their axis in a dot-dash line, see FIGS. 4a and 4b) fastened in two bores of the calliper, and each of which is received sliding in an axial bore associated with a beam 143 of the fixed support 140.

Each brake pad 118 is thus mounted sliding in an axial direction, parallel to the axis of rotation of the brake disc, in the fixed support 140 along an operating travel between:
  an active position, in which the friction brake lining of the brake pad presses against the face opposite the brake disc, and an inactive position, in which the friction brake lining of the brake pad 118 is axially moved away from the associated face of the brake disc by a predetermined working play.

During a braking operation, the gripping of the brake pads 118, from their inactive position up to their active position, is controlled by a brake calliper 36 of the disc brake 100.

During a braking operation, the axial brake piston axially acts on the brake pad towards the disc to exert an axial gripping force of the friction brake lining pressing against the face of the brake disc (FIG. 4b). In response, the calliper 36 slides axially backwards and, symmetrically, the forward arm 42 acts on the forward brake pad 118 (wheel side) to grip the friction brake lining of the forward brake pad 118 pressing against the opposing face of the brake disc (FIG. 4a).

When, at the end of the braking operation, the brake piston stops acting on the rear brake pad 118, the return of the brake pads 118, from their active position to their inactive position, is generally caused by the rotation of the brake disc, which "repels" each brake pad 18 to its inactive position.

However, in certain cases, it is noted that the repulsive force exerted by the brake disc is not sufficient to repel each of the brake pads 118 up to its respective inactive position. The friction brake lining of the brake pads 118 thus continue to rub against the brake disc, while no braking action is required.

At the end of a braking operation, to guarantee that each brake pad 118 returns to an inactive position, the disc brake 100 is equipped with elastic return means for returning the brake pad 118 to its inactive position. These elastic return means are produced in the form of elastic return springs which connect the brake pad 118 and the fixed support 140 to one another.

The disc brake 100 comprises by way of non-limitative example four axial elastic return springs 1, also called "spreader" springs, each of which—non-limitatively—is here arranged to connect a limb of the fixed support 140 and a lateral lug associated with a brake pad 118 to one another.

Thus, each brake pad 118, rear or forward, is here associated with two axial elastic return springs 1 each of which cooperates with the plate forming the back of the pad and which bears the friction brake lining.

In the present case and by way of non-limitative example, the four axial elastic return springs of one and the same brake are of the same overall design and they are arranged in the same manner on the fixed support 140. The design principle of a single one of these axial elastic return springs of the brake pad 18 will thus be described here in detail. However, it is entirely anticipated to mix different types of springs on one and the same brake, for example different versions of springs according to the invention but also springs according to the invention with springs of a known type.

An axial elastic return spring 1 is in the form of a metallic band, for example made from steel, with a rectangular shape and which is produced for example by cutting, stamping and folding a sheet of stainless steel of constant thickness. All the material of the axial elastic return spring is of the elasto-plastic type. By way of example, the thickness of the band of material is comprised between 0.5 and 0.8 millimetres and the material is a stainless steel of reference X2CrNbCu21 or reference 304L (X2CrNi18-9/X2CrNi19-11).

With reference to FIGS. 4a, 4b, 15a and 15d, each spring 1 presses against a transverse face, called axial pressing face 141a, 142a, which is here substantially parallel to the plane of the brake disc.

Figure 8:
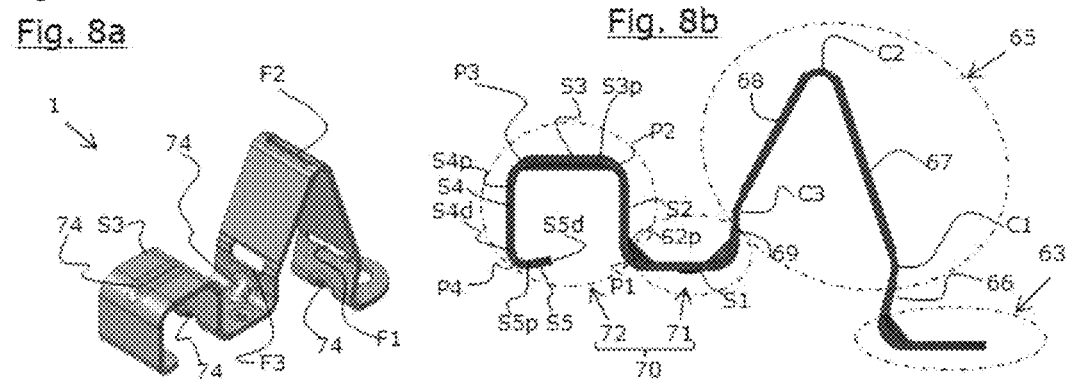
Figure 9:
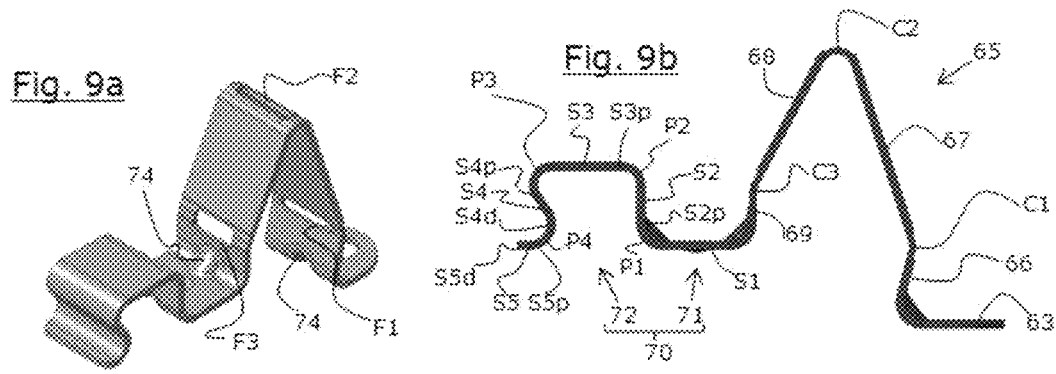
FIG. 9 comprising FIG. 9a and FIG. 9b.
Figure 10:
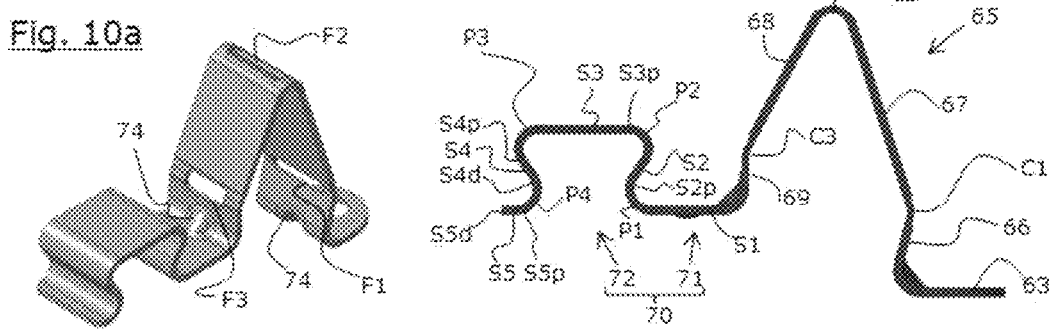
FIG. 10 comprising FIG. 10a and FIG. 10b.
Figure 11:
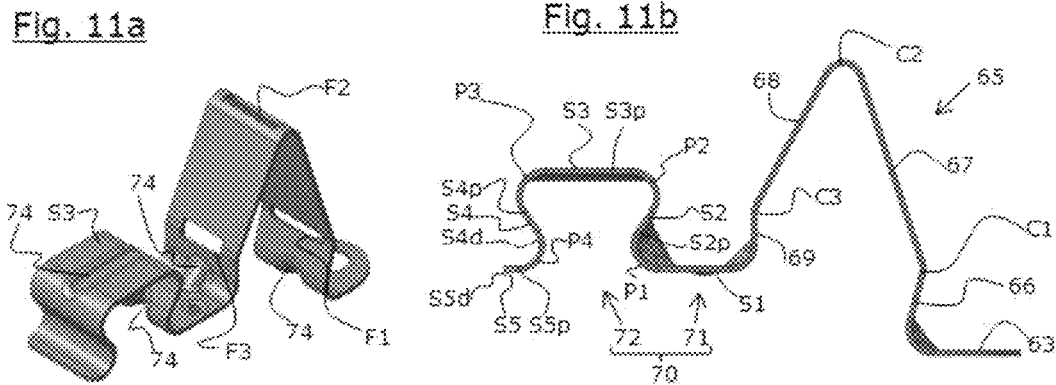
Figure 12:
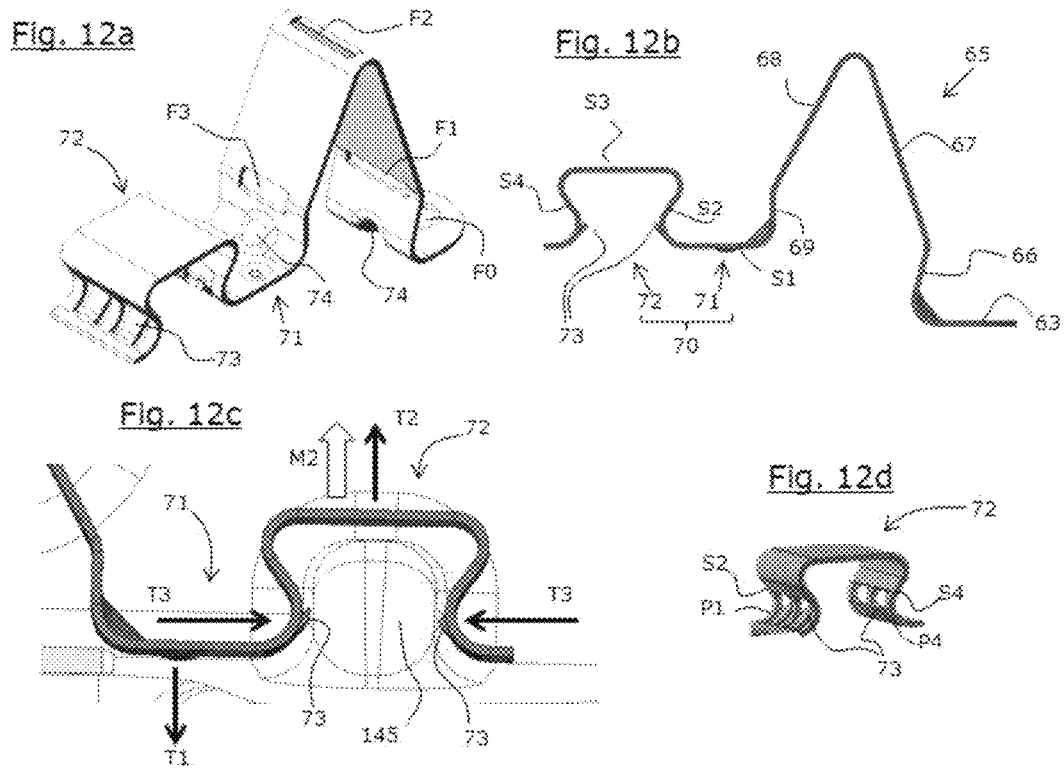
Figure 13:
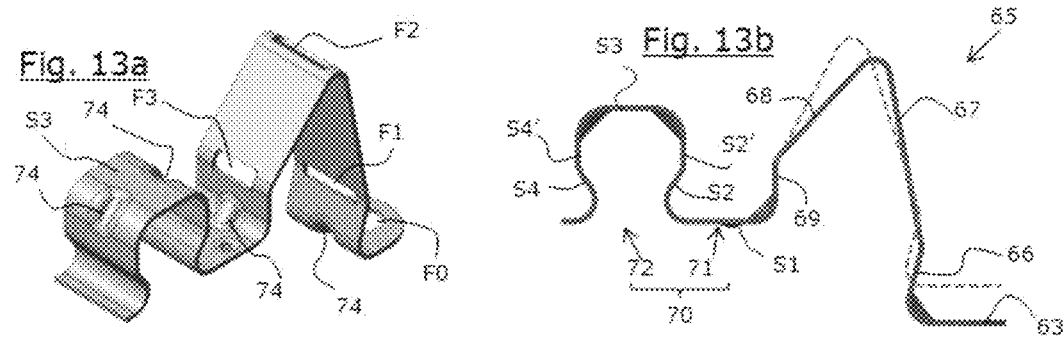
Figure 14:
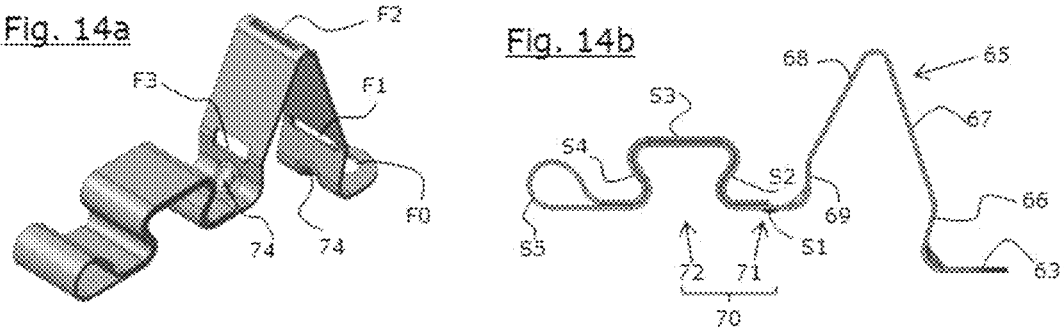

According to any of the embodiments, each axial elastic return spring comprises, in the manner illustrated by dot-dash ellipses in FIG. 8b:
- a pad portion 63 in the form of a fastening tab arranged to be fastened on a brake pad or receive a pressing of said pad,
- an elastic and plastic deformation portion 65, provided to produce a reaction force during the axial pressing of said pad so as to return said brake pad translationally to the inactive position.

With reference to FIGS. 8a, 9a, 10a, 11a, 12a, 13a, 14a and 16a, the pad portion 63 here comprises a through hole so as to be able to fasten therein said spring on the pad, for example by riveting on the surface of the plate that forms the back of the pad and supports the friction brake lining material.

Alternatively, with or without a hole, the pad portion 63 can also be inserted under a pad portion forming a return, for example under the plate forming the back of the pad, and thus exert its return force by simple axial pressing.

The pad portion 63 is connected to the deformation portion 65 by an elbow, produced by folding in a direction transverse to the spring, so that the angular distance between the carrier portion and the deformation portion is comprised between 60 degrees and 90 degrees.

Preferably, the deformation portion 65 is produced by folding so as to have several successive sections connected to one another by deformation folds Ci, here four successive sections 66, 67, 68 and 69, see FIGS. 8b, 9b, 10b, 11b, 12b, 13b, 14b and 16b. Each section 66, 67, 68 and 69 is preferably rectilinear and substantially rigid (or at least elastic). The deformation folds Ci make it possible to produce the elasticity, which induces a sufficient and necessary return action of the brake pad, and the plasticity makes it possible to build up a plastic deformation that is sufficient to follow the wear of the friction brake lining of the brake pad.

The pad portion 63 is rigidly connected to the deformation portion via the proximal end of the first section 66. The distal end of the first section 66 is connected to the second section 67. The second rigid section 67 is connected to the first rigid section 66 by a first deformable deformation fold C1.

So that the first fold C1 in the shape of an elbow constitutes an area that is both elastically and plastically deformable, this portion is mechanically weakened, here by means of a window or opening F1, which is here a rectangular through cut-out.

In the same way, the third rigid section 68 is connected to the second rigid section 67 by a second deformation fold C2 that is elastically and plastically deformable, which comprises a window F2 in the band of material.

Finally, the fourth section 69 is connected to the third rigid section 68 by a third deformation fold C3 that is elastically and plastically deformable. The third fold C3 comprises a window F3 similar to the windows F1 and F2.

The fourth and here last rigid section 69 is rectilinear and has an axial general orientation and extends rigidly through the carrier portion.

By way of example, the maximum plastic displacement corresponding to a maximum wear is typically equal to approximately 14 millimetres. The maximum displacement corresponds substantially to the maximum wear thickness of a friction brake lining of a brake pad. When the brake pad 118 is acted on towards its active position by the brake piston, the brake pad 118 brings with it the pad portion 63 of the return spring, which causes the first section 66 of the elastic return spring so as to elastically deform the axial elastic return spring 1, between the carrier portion 70 fastened to the fixed support 140 and the first section 66 connected to the brake pad 118.

The elastic return spring and its folds Ci deform first elastically up to the elasticity limit of its weakest parts, the folds Ci. The elasticity and the resistance of these folds Ci is chosen and determined so that this elastic travel corresponds to the working play sought.

When this elastic limit is reached, if the forward transverse face of the friction brake lining of the brake pad 118 is still moved away from the associated face or annular track of the brake disc, the brake pad 118 pursues its axial travel up to its active position in contact with the disc.

During this second part of the travel, the stresses in the spring exceed the resistance of the folds Ci, and the latter are then plastically deformed.

When the braking operation ends, the brake pad 118 is returned to its inactive position by the elastically deformable parts which regain their rest state, but in a position which has been brought closer to the disc by the plastic deformation of the folds.

The brake pad 118 is then once again separated from the brake disc under the elastic return effect of the axial spring 1, but only by a distance equal to the only determined working play. The wear play having been absorbed by the plastic deformation of the plastically deformable folds Ci.

The elastic return spring 1 thus makes it possible to ensure that the brake pad 118 is returned to an inactive position, which is still at the same distance from the disc despite the wear of the pad.

Moreover, by preserving a constant working play between the brake pad 118 in the inactive position and the brake disc, the response time of the brake system remains constant independently of the wear of the friction brake lining, as well as the force necessary to actuate the pads.

This plastic deformation also makes it possible to prevent the gripping force to be exerted by the brake piston in order to actuate the brake pad 118 towards its active position from increasing when the wear increases.

On complete maximum wear of the friction brake lining, the axial elastic return spring 1 is plastically deformed and, as the brake pad is worn, it must be replaced.

With reference to FIGS. 8b, 9b, 10b, 11b, 12b, 13b, 14b and 16b, the axial elastic return spring comprises a carrier portion 70 arranged to be fastened on the fixed support 140 of the disc brake. The carrier portion 70 comprises a support part 71 and a connection part 72, in the manner illustrated by dot-dash ellipses in FIG. 8b.

The support part 71 comprises a first support section S1 which:
- is integral with the fourth section 69 of the deformation portion, via an elbow,
- extends in a plane orthogonal to the direction of axial sliding of the brake pad, and
- is arranged to press axially on a pressing face 141a, 142a of the fixed support 140 when the pad leaves its inactive position towards the active position and when the pad leaves its active position towards the inactive position.

The connection part 72 comprises at least one connection fold P1 arranged and configured to press on an anchoring part 145 carried by the transverse pressing face 141a, 142a of the fixed support 140. The connection part 72 cooperates with the anchoring part to prevent a lifting M2 of said connection part of the spring 1 (see FIGS. 12c, 17 and 18).

First family of embodiments FIGS. 4a to 14b illustrate a first family of embodiments of axial elastic return springs, in which the connection part 72 of the carrier portion 70 grips the anchoring part 145 of the carrier 140.

Figure 17:
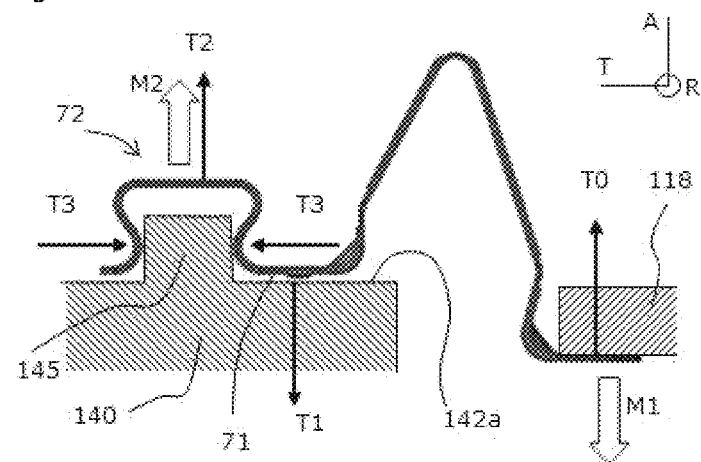
FIG. 17 is a diagram illustrating the mechanical actions being exerted on a spring according to the invention with the carrier and the pad, in the context of the first family of embodiments.
Figure 18:
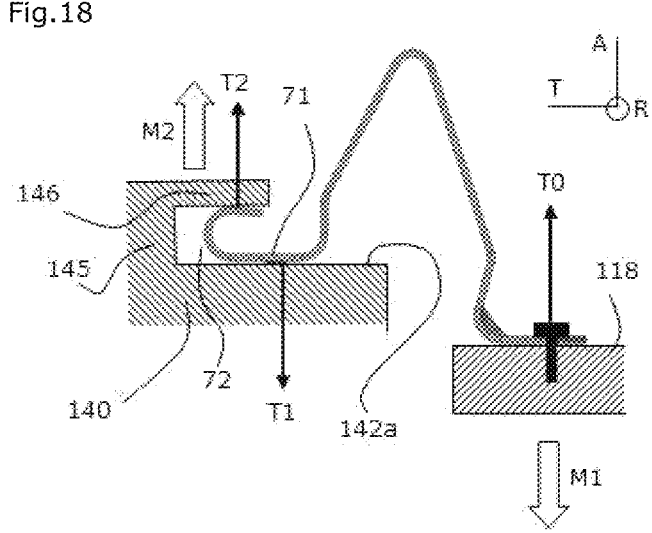
FIG. 18 is a diagram illustrating the mechanical actions being exerted on a spring according to the invention with the carrier and the pad, in the context of the second family of embodiments.

FIG. 17 shows in more detail the mode of interaction of the spring with the carrier and with the pad. The pad portion 63 shown here is slid under the plate constituting the back of the pad 118, which thus moves it towards the disc without needing to be fastened there. Alternatively, the pad portion can also be fastened on the top of the plate of the pad, for example by riveting as illustrated in FIG. 18.

During displacement, shown by the arrow M1, of the brake pad 118 towards the disc, the pad portion 63 is moved by the pad 118. The support part 71 presses on the pressing surface 142a of the carrier so as to exert an axial pressing force, shown by the arrow T1. On the other side of this pressing T1, the connection part 72 pinches the opposed faces of the peg of the anchoring part 145 so as to exert a pinching force, shown by the arrows T3, which thus opposes its lifting, shown by the arrow M2. By a lever effect around a radial direction passing through the support part 71, due to the axial pressing force T1, the elasticity of the spring thus exerts an axial lifting force, shown by the arrow T2, on the carrier, and an axial return force, shown by the arrow T0, on the brake pad.

In these examples, this connection part 72 comprises at least three connection sections:
- a second lateral connection section S2, a proximal end S2p of which is connected to the first support section S1 by a connection fold P1, the folding axis of which is orthogonal to the axial direction A of the displacement of the brake pad 118, and which goes back up along a first face of the anchoring part 145;
- a third connection section S3, a proximal end S3p of which is connected to the second section S2 by a connection fold P2, the folding axis of which is orthogonal to the axial direction A of the displacement of the brake pad 118, and which extends above the anchoring part 145 and straddles the latter;
- a fourth lateral connection section S4 comprising a distal end S4d, and a proximal end S4p connected to the third section S3 by a connection fold P3, the folding axis of which is orthogonal to the axial direction A of the displacement of the brake pad 118, and which goes back down on the other side of the anchoring part 145, along a second face of the latter opposite to its first face.

The three sections S2, S3, S4 and/or the three folds P1, P2, P3 are arranged to substantially form a "U", in such a way that the connection part 72 can fit on the anchoring part 145 in the form of a peg, and thus prevent the lifting M2 (see FIG. 12c) by a pinching T3 of said peg. The connection sections S2, S3, S4 are rigid. The folds P2 and P3 are elastically deformable so that the lateral connection sections S2 and S4 can be moved further apart.

The connection part 72 pinches T3 the base of the anchoring part 145 in the form of a peg in order to prevent the lifting M2 of the spring.

With reference to FIGS. 8a and 8b, the second S2 and fourth S4 lateral connection sections are substantially straight and perpendicular to the first support section S1 so as to form a straight "U". The other examples of this family will only be described by their differences.

With reference to FIGS. 10a to 12d, the second S2 and fourth S4 lateral connection sections are substantially inclined in such a manner that the distance between the proximal end S2p and the distal end S4d is less than the length of the third connection section S3, so that the connection part is in the shape of an omega.

According to a first hybrid embodiment variant of the two preceding types of embodiments, and with reference to FIGS. 9a and 9b, the second lateral connection section S2 is straight and perpendicular to the support section S1, while the fourth lateral connection section S4 is inclined, so that the connection part is in the shape of a half omega.

According to a second embodiment variant, which can be seen as a hybrid of the two preceding types of embodiments, and with reference to FIGS. 13a and 13b, the connection part comprises five connection sections:

a second lateral connection section S2
  a first intermediate connection section S2', a proximal end of which is connected to the second connection section S2, said first intermediate section being straight and perpendicular to the support section S1,
  a third connection section S3, a proximal end of which is connected to the first intermediate connection section S2',
  a second intermediate connection section S4', a proximal end of which is connected to the third connection section S3, said second intermediate section being straight and perpendicular to the support section S1, and/or parallel to the first intermediate connection section S2',
  a fourth lateral connection section S4, a proximal end S4p of which is connected to the second intermediate section S4'.

It will be noted that FIG. 13b shows the elastic part 65 in two different positions, in a way which is applied in a similar manner for all of the other embodiments. The dotted outline shows the resting position before mounting. The solid outline shows a position that is already deformed, in which it is seen that the pad part 63 has an axially offset position, which is lower in the figure and corresponds to a pad that is closer to the disc.

According to a particular embodiment, the connection part 72 comprises lateral studs 73 arranged to project from a lateral connection section S2, S4 towards the opposing lateral connection section. With reference to FIG. 12c, the studs 73 produce elastic clamps provided for gripping or over-centering on the anchoring part 145 of the fixed support.

With reference to FIGS. 12a, 12b, 12c and 12d, the connection part 72 comprises four studs 73: two studs per lateral connection section. Preferably, the studs 73 are obtained by "U"-shaped cut-outs from the metallic band of the spring. The cut-outs are produced in such a manner that the base of the "U" is located in a lateral connection section S2, S4 and the arms of the "U" extend up to the level of the folds P1 and P4, see FIG. 12d.

Moreover, with reference to FIGS. 8b, 9b, 10b, 11b, 12b, 13b and 14b, the connection part comprises a fifth connection section S5 which comprises a distal end S5d, and a proximal end S5p connected to the fourth section S4 by a fold P4 the folding axis of which is orthogonal to the axial direction A of the displacement of the brake pad 118.

According to a particular embodiment and with reference to FIG. 8b, the fifth connection section extends in the direction of the first support section S1 or the second connection section S2, so as to produce a gripping or over-centering tab with the anchoring part.

With reference to FIGS. 9b, 10b, 11b, 12b, 13b and 14b, the connection part comprises a fifth connection section S5 which extends in a opposite direction to that of the first support section S1, so as to produce a support tab capable of pressing on the pressing face of the fixed support, so that the first support section with respect to the anchoring part.

According to another particular embodiment and with reference to FIGS. 14a and 14b, the fifth connection section S5 extends in the direction opposite to that of the first support section S1, produces a folding loop and doubles the connection part over all its outer surface, so as to form an overwrap or overstrength. This characteristic makes it possible to mechanically reinforce the carrier portion without changing the thickness of the metal strip used to manufacture the spring.

Second Family of Embodiments

FIGS. 15a to 16b illustrate a second family of embodiments of axial elastic return springs, which will only be described by its differences with respect to the first family. In these embodiments, the connection part 72 of the carrier portion 70 comprises a second connection section S2, a proximal end S2p of which is connected to the first support section S1 by a connection fold P1, the folding axis of which is orthogonal to the axial direction A of the displacement of the brake pad. The fold P1 substantially forms a half-cylinder.

Figure 15A:
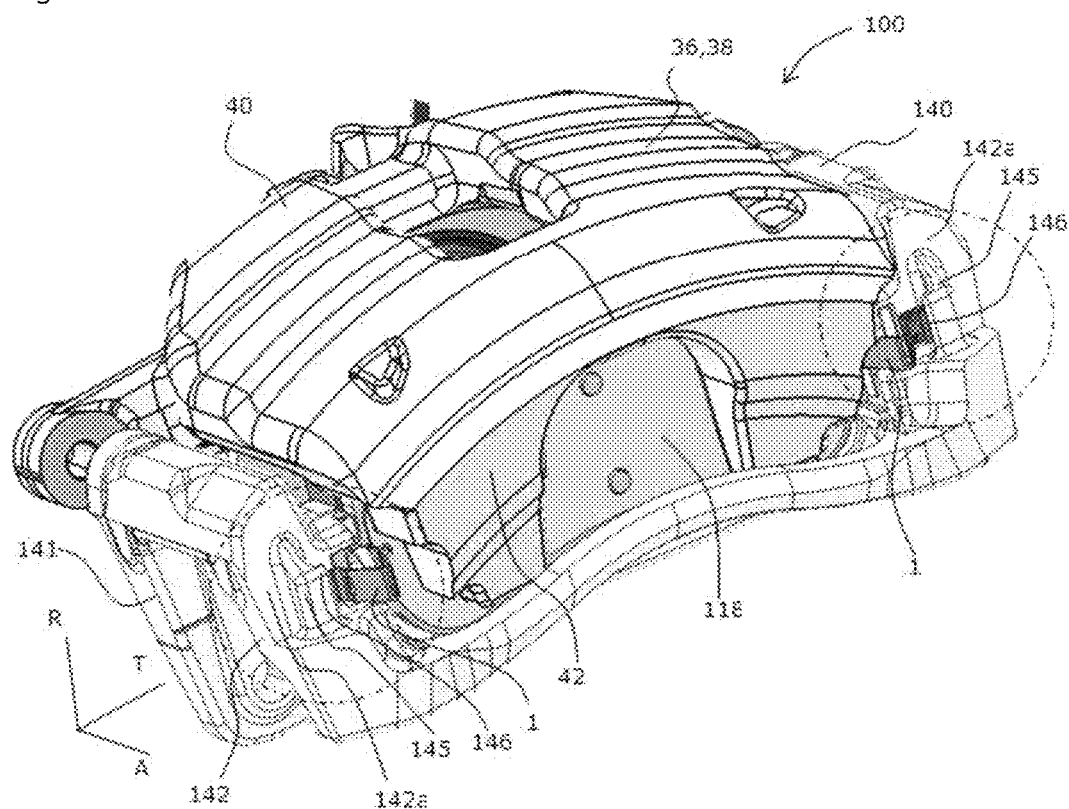
FIGS. 15a and 15d are perspective views of a disc brake comprising two axial elastic return springs, according to a second family of embodiments, arranged on either side of a brake pad, each spring being on the one hand fastened to an end of a brake pad, and on the other hand connected to the fixed support of the brake by fitting.
Figure 15B:
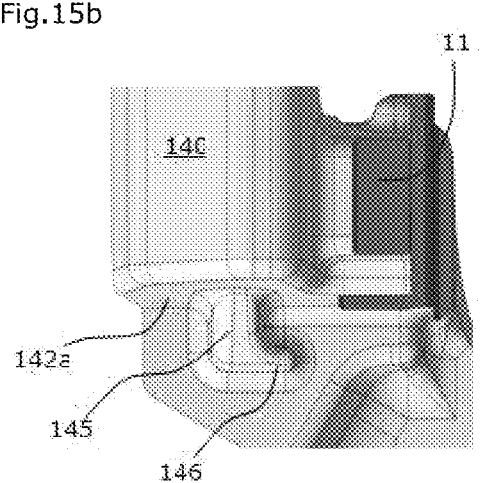
Figure 15C:
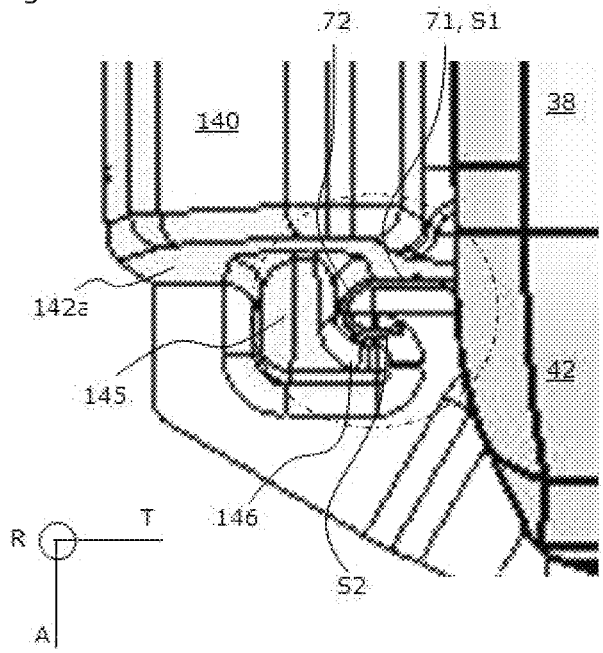
Figure 15D:
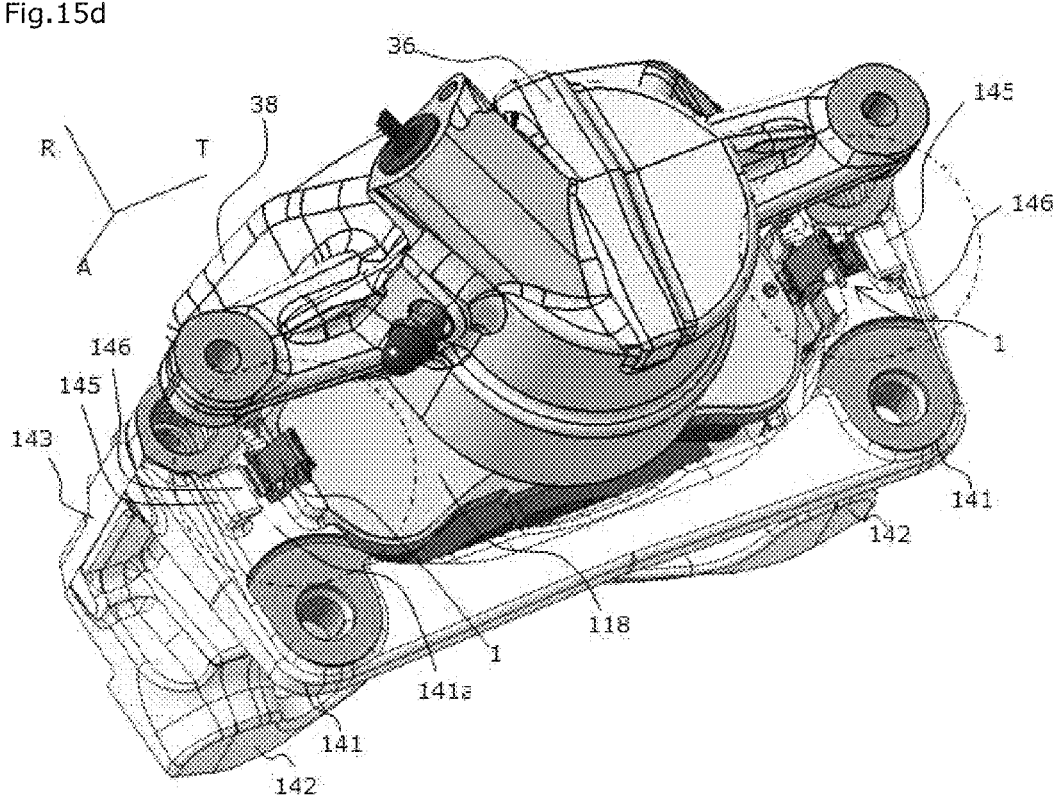

The second section S2 extends substantially parallel to the first support section S1 so as to be able to be inserted under a projection 146 of the anchoring part 145 in the form of a peg, see FIGS. 15c and 15f, and thus prevent the lifting M2 by an axial pressing T2 applied under said projection, see FIG. 18.

FIG. 18 shows in more detail the mode of interaction of the spring with the carrier and with the pad in this family of embodiments. The pad portion 63 shown here is fastened to the back of the pad 118, for example by a rivet. Alternatively, the pad portion can also be slid under the plate constituting the back of the pad 118, which thus moves it towards the disc without needing to be fastened there, for example as illustrated in FIG. 18.

During the displacement M1 of the pad towards the disc, the pad portion 63 is moved by the pad 118. The support part 71 presses on the pressing surface 142a of the carrier so as to exert an axial pressing force, shown by the arrow T1. On the other side of this pressing T1, the connection part 72 presses under the projection 146 of the anchoring part 145 so as to exert an axial lifting force, shown by the arrow T2, which projection 146 thus opposes its lifting M2. By a lever effect around a radial direction passing through the support part 71, due to the axial pressing force T1, the elasticity of the spring thus exerts an axial lifting force T2 on the carrier, and an axial return force on the pad, shown by the arrow T0.

According to any of the embodiments, the axial elastic return spring can comprise at least one rib 74 arranged across a fold and/or between two consecutive folds. With reference to FIGS. 8a to 12b, 13a to 14b, the spring 1 comprises ribs 74 at the base of the deformation portion.

With reference to FIGS. 9b and 11b, the spring 1 here comprises a rib 74 between the support part 71 and the second lateral connection section.

With reference to FIGS. 8a and 11a, the spring 1 comprises a rib 74 on the upper face of the third connection section S3.

With reference to FIGS. 13a and 13b, the spring 1 comprises ribs 74 arranged on the connection folds P2 and P3.

Anchoring Part

The anchoring part 145 of a fixed support 140 will now be described, arranged and configured to cooperate with an axial elastic return spring. The anchoring part has the general form of a peg projecting axially from a pressing face 141a, 142a of the fixed support 140. According to any of the embodiments, the anchoring part is preferably moulded in a single part with said fixed support so as to be able to receive and cooperate with the carrier portion of an axial elastic return spring defined above.

Preferably, the pressing face 141a, 142a arranged on each limb 141 or 142 extends in a plane parallel to the plane of the brake disc.

According to an embodiment, in particular according to the first family of embodiments of the axial elastic return spring, FIGS. 5b, 6b and 7b illustrate in more detail different forms provided for this anchoring part 145, which can be combined with the different forms of the connection part 72.

With reference to FIGS. 5a and 5b, the anchoring part is in the form of a peg, all of the edges of which are rounded. For example, the anchoring part has a cross-section that is substantially in the form of a half-cylinder.

Preferably, but not necessarily, the anchoring part 145 comprises at least one projection 146 or a beading projecting transversely from the axial distal end so as to define an overhang between said projection and the pressing face 141a, 142a of the fixed support. The projection is moulded from a single part with said support so as to be able to receive and cooperate with the carrier portion of said spring. With reference to FIGS. 6b and 7b, the projection 146 extends from one or both sides of the anchoring part. For example, each projection extends transversely (and in particular tangentially) by an equal length between 10% and 30% of the width of the anchoring part, preferably between 15% and 20% of the width of the anchoring part. The size of the projection is in particular selected as a function of the elastic capacity of the connection part, in particular of the maximum possible distance between the folds P1 and P4 due to the elastic deformation of the connection part. The anchoring part is provided to be surrounded by the connection part of the spring. Under the pinching effect T3, each of these overhangs 146 allows a better anti-lifting restraint M2 of the connection part 72 of the spring.

According to an embodiment variant in particular according to the second family of embodiments of the axial elastic return spring, and with reference to FIGS. 15a to 15f, the anchoring part comprises a projection 146 extending transversely (and in particular tangentially) to its end, with an equal length between 40% and 100% of the width of the anchoring part, preferably between 50% and 60% of the width of the anchoring part. The size of the projection is in particular chosen as a function of the elastic capacity of the deformation portion, in particular the capacity of the fold C2 to be elastically deformed so that the sections 67 and 68 move closer together so as to introduce the connection part 72 under the projection 146, see FIGS. 15c and 15f. In this embodiment, the spring is thus held in position due to the pressing T2 under the projection 146 of the anchoring part 145.

Of course, the invention is not limited to the examples that have just been described and various arrangements can be made to these examples without exceeding the scope of the invention.

WORD LIST

Figure 2:
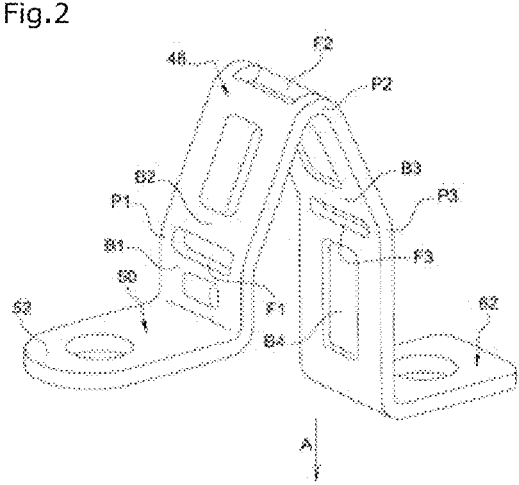
Figure 3:
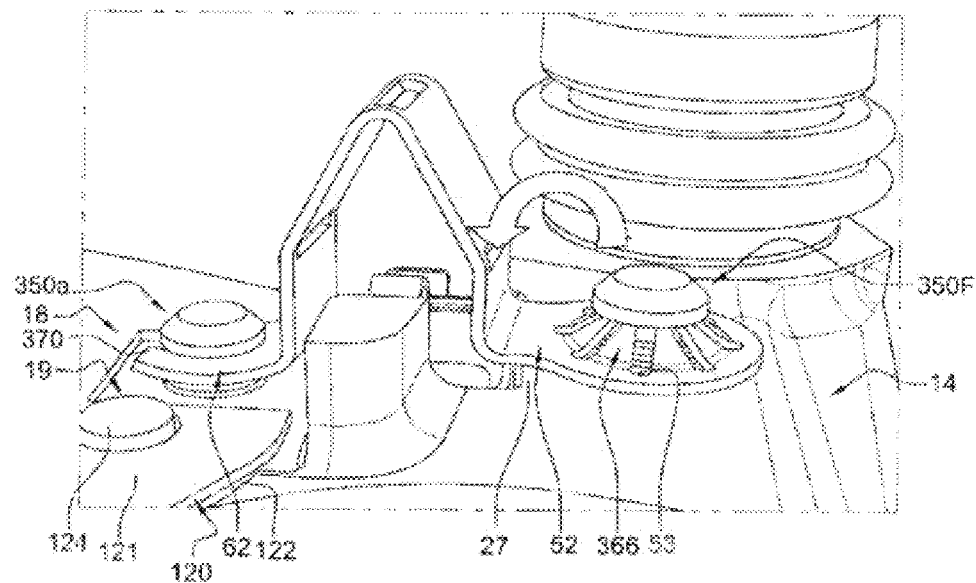

State of the art (FIG. 1, FIG. 2, FIG. 3)
14 fixed support
18 brake pad
48 elastic return spring
50 fastening part of the spring
52 fastening tab
53 orifice
350F pin having axial orientation
366 inner toothing
Invention
A axial direction
T tangential direction
R radial direction
Disc brake
100 disc brake
36 brake calliper
38 arch
40 calliper rear arm
42 calliper forward arm
118 brake pad
Fixed support
140 fixed support, carrier
141 inner or rear limbs of the fixed support
141a pressing face of the rear limbs of the fixed support
142 outer or forward limbs of the fixed support
142a pressing face of the forward limbs of the fixed support
143 beam of the fixed support
145 anchoring part of the fixed support
146 projection of the anchoring part
11 pad housings
Axial elastic return spring
1 axial elastic return spring
63 pad portion of the spring
65 elastic (and plastic) deformation portion of the spring
66 first section of the deformation portion
67 second section of the deformation portion
68 third section of the deformation portion
69 fourth section of the deformation portion
C1 first deformation fold
C2 second deformation fold
C3 third deformation fold
70 carrier portion
71 support part of the carrier portion
S1 first support section of the support part
72 connection part of the carrier portion
S2 second lateral connection section
S2p proximal end of the second connection section
S2' first intermediate connection section
S3 third connection section
S3p proximal end of the third connection section
S4 fourth lateral connection section
S4p proximal end of the fourth connection section
S4d distal end of the fourth connection section
S4' second intermediate connection section
S5 fifth connection section
S5p proximal end of the fifth connection section
S5d distal end of the fifth connection section
73 stud, connection clamp
74 reinforcement rib
F1 window or opening
F2 window or opening
F3 window or opening
M1 displacement of the pad on activation
M2 tendency of the spring to lift T0 return force applied to the pad
T1 return pressing of the spring on the carrier
T2 rising force exerted by the spring on the carrier
T3 pinching of the anchoring part

The invention claimed is:

1. An axial elastic return spring for axially returning a brake pad of a disc brake from an active position to an inactive position, said spring being intended to be interposed between the brake pad and a fixed support, said spring comprising:
   an elastic deformation portion, arranged to produce a reaction force during pressing of said pad in the active position, so as to return translationally said brake pad to the inactive position;
   a carrier portion arranged to be fastened on the fixed support of the disc brake, and which is integral with the deformation portion;
   a pad portion arranged to be fastened to the brake pad, in the form of a fastening tab, which is integral with the deformation portion and which extends in a plane orthogonal to a direction of axial sliding (A) of the brake pad;
the carrier portion including a support part having a first support section which:
   is integral with the deformation portion;
   extends in a plane orthogonal to the direction of axial sliding (A) of the brake pad; and
   is arranged to press axially on the fixed support under the effect of the deformation of the spring when the brake pad leaves its inactive position, and the carrier portion comprises a connection part comprising at least one connection fold arranged and configured to press on an anchoring part carried by a transverse face of the fixed support, and cooperate with said anchoring part to prevent lifting of said connection part;
the connection part including:
   a second lateral connection section, a proximal end of which is connected to the first support section by a first fold, a folding axis of which is orthogonal to the axial sliding direction (A) of the displacement of the brake pad;
   a third connection section, a proximal end of which is connected to the second section by a second fold, a folding axis of which is orthogonal to the axial sliding direction (A) of the displacement of the brake pad;
   a fourth lateral connection section comprising a distal end, and a proximal end connected to the third section by a third fold, a folding axis of which is orthogonal to the axial sliding direction (A) of the displacement of the brake pad; and
the at least second lateral connection, the third connection, and the fourth lateral connection sections and/or the first, second and third folds being arranged to substantially form a "U", in such a way that the connection part can fit on the anchoring part in the form of a peg, and thus prevent the lifting by a pinching of said peg,
whereby when the brake pad leaves its inactive position, the first support section, during a displacement M1, is arranged to press axially on the fixed support with an axial pressing force T1 under the effect of the deformation of the spring, and the connection part is arranged to prevent the lifting of the connection part by pinching of the peg according to a pinching force T3 by the second and fourth sections of the connection part which thus opposes a lifting M2 of the connection part and by a lever effect around a radial direction passing through the support part, due to the axial pressing force T1, the elasticity of the spring thus exerts an axial lifting force T2, on the carrier, and an axial return force, T0, on the brake pad, to return the brake pad to the inactive position.

2. The spring according to claim 1, characterized in that the elastic deformation portion is an elastic and plastic deformation portion, arranged to undergo an elastic deformation that produces a reaction force, during pressing of said pad, so as to return said brake pad translationally to the inactive position, said reaction force being kept substantially constant during wear of the pad under the effect of a plastic deformation being produced in said spring beyond a predetermined amplitude of said deformation.

3. The spring according to claim 1, characterized in that the second and fourth lateral connection sections are substantially straight and perpendicular to the first support section so as to form a straight "U".

4. The spring according to claim 1, characterized in that the folds are elastically deformable and in that the second and/or fourth lateral connection sections are inclined or curved in such a manner that the distance between the proximal end and the distal end is less than the length of the third connection section, so as to pinch the base of the anchoring part in the form of the peg in the shape of an omega or half omega.

5. The spring according to claim 1, characterized in that the lateral connection sections have studs projecting in the direction of an opposing section, producing elastic clamps provided to grip on the anchoring part.

6. The spring according to claim 1, characterized in that the connection part comprises a fifth connection section comprising a distal end configured as an overfolded loop, and a proximal end connected to the fourth section by a fold, the folding axis of which is orthogonal to the axial direction (A) of the displacement of the brake pad.

7. The spring according to claim 6, characterized in that the fifth section extends in a direction opposite to the first support section.

8. The spring according to claim 1, characterized in that the spring is produced in a single part by cutting and forming a sheet or a strip of material.

9. The spring according to claim 1, characterized in that the spring comprises at least one rib arranged across one of said first, second or third folds and/or between two consecutive said folds.

10. A set comprising a brake pad and an axial elastic return spring according to claim 1, characterized in that the pad portion of the axial elastic return spring is fastened to the brake pad in a non-removable manner.

11. A set comprising a brake pad and two axial elastic return springs according to claim 1, paired with said brake pad.

12. A fixed support for a brake caliper of a disc brake of a motor vehicle characterized in that it has an anchoring part in the form of a peg projecting axially from a pressing face) of the fixed support, said anchoring part in the form of a peg being moulded from a single part with said fixed support so as to be able to receive and cooperate with the carrier portion of an axial elastic return spring according to claim 1.

13. A fixed support for a brake caliper of a disc brake of a motor vehicle, said support having an anchoring part carried by a transverse face of said fixed support and comprising at least one projection projecting transversely, said projection being moulded in a single part with said fixed support, so as to be able to receive and cooperate with the carrier portion of an axial elastic return spring according to claim 1.

14. A disc brake of a motor vehicle comprising:
a brake disc which extends in a plane transverse to an axial orientation axis (A) of rotation of the brake disc;
a support fixed with respect to a frame of the vehicle, said support being arranged according to claim 12;
at least one brake pad mounted sliding axially in the fixed support between an active position in which the at least one brake pad is pressed against the associated braking track of the brake disc, and an inactive position in which the at least one brake pad is axially moved away from said braking track of a non-zero working play;
at least one axial elastic return spring, mounted in a removable manner with respect to the fixed support between the at least one brake pad and the fixed support so as to exert a return force of said at least one brake pad towards its inactive position,
a brake caliper arranged and configured to be held by the fixed support and act on the at least one brake pad towards its active position.

15. A method for mounting at least one axial elastic return spring, according to claim 1, on a fixed support for a brake caliper of a disc brake of a motor vehicle, having an anchoring part in the form of a peg projecting axially from a pressing face of the fixed support, said anchoring part in the form of a peg being moulded from a single part with said fixed support so as to be able to receive and cooperate with the carrier portion of the return spring, comprising the steps consisting of:
mounting a brake pad in or on a fixed support; and
mounting said axial elastic return spring by axially fitting, by clipping, the connection part on the anchoring part in the form of a peg carried by the fixed support.

16. An axial elastic return spring for axially returning a brake pad of a disc brake from an active position to an inactive position, said spring being intended to be interposed between the brake pad and a fixed support, said spring comprising:
an elastic deformation portion, arranged to produce a reaction force during pressing of said pad in the active position, so as to return translationally said brake pad to the inactive position,
a carrier portion arranged to be fastened on the fixed support of the disc brake, and which is integral with the deformation portion,
a pad portion arranged to be fastened to the brake pad, in the form of a fastening tab, which is integral with the deformation portion and which extends in a plane orthogonal to the direction of axial sliding (A) of the brake pad,
the carrier portion includes a support part having a first support section which:
is integral with the deformation portion,
extends in a plane orthogonal to the direction of axial sliding (A) of the brake pad, and
is arranged to press axially on the fixed support under the effect of the deformation of the spring when the brake pad leaves its inactive position,
and the carrier portion includes a connection part comprising at least one connection fold arranged and configured to press on an anchoring part carried by a transverse face of the fixed support, and cooperate with said anchoring part to prevent lifting of said connection part,
the connection part comprises at least three connection sections:
a second lateral connection section, a proximal end of which is connected to the first support section by a first fold, a folding axis of which is orthogonal to the axial direction (A) of the displacement of the brake pad;
a third connection section, a proximal end of which is connected to the second section by a second fold, a folding axis of which is orthogonal to the axial direction (A) of the displacement of the brake pad;
a fourth lateral connection section comprising a distal end, and a proximal end connected to the third section by a third fold, the folding axis of which is orthogonal to the axial direction (A) of the displacement of the brake pad; and
the at least second lateral connection, third connection and fourth lateral connection sections and/or the first, second and third folds being arranged to substantially form a "U", in such a way that the connection part can fit on the anchoring part in the form of a peg, and thus prevent the lifting by a pinching of said peg,
the connection part comprising fifth connection section comprising a distal end configured as an overfolded loop, and a proximal end connected to the fourth section by a fourth fold, the folding axis of which is orthogonal to the axial direction (A) of the displacement of the brake pad.

17. An axial elastic return spring for axially returning a brake pad of a disc brake from an active position to an inactive position, said spring being intended to be interposed between the brake pad and a fixed support, said spring comprising:
an elastic deformation portion, arranged to produce a reaction force during pressing of said pad in the active position, so as to return translationally said brake pad to the inactive position;
a carrier portion arranged to be fastened on the fixed support of the disc brake, and which is integral with the deformation portion;
a pad portion arranged to be fastened to the brake pad, in the form of a fastening tab, which is integral with the deformation portion and which extends in a plane orthogonal to the direction of axial sliding (A) of the brake pad;
the carrier portion including a support part having a first support section which:
is integral with the deformation portion;
extends in a plane orthogonal to the direction of axial sliding (A) of the brake pad; and
is arranged to press axially on the fixed support under the effect of the deformation of the spring when the brake pad leaves its inactive position, and the carrier portion comprises a connection part comprising at least one connection fold arranged and configured to press on an anchoring part carried by a transverse face of the fixed support, and cooperate with said anchoring part to prevent lifting of said connection part,
the connection part comprises at least three connection sections:
a second lateral connection section, a proximal end of which is connected to the first support section by a first fold, a folding axis of which is orthogonal to the axial direction (A) of the displacement of the brake pad;
a third connection section, a proximal end of which is connected to the second section by a second fold, a folding axis of which is orthogonal to the axial direction (A) of the displacement of the brake pad;
a fourth lateral connection section comprising a distal end, and a proximal end connected to the third section by a third fold, a folding axis of which is orthogonal to the axial direction (A) of the displacement of the brake pad; and the at least second lateral connection, the third connection, and the fourth lateral connection sections and/or the first, second and third folds being arranged to substantially form a "U", in such a way that the connection part can fit on the anchoring part in the form of a peg, and thus prevent the lifting by a pinching of said peg, the connection part comprising a fifth connection section comprising a distal end configured as an overfolded loop, and a proximal end connected to the fourth section by a fourth fold, a folding axis of which is orthogonal to the axial direction (A) of the displacement of the brake pad, the fifth connection section extends in the direction of the first support section or the second connection section, so as to produce a gripping or over-centering tab with the anchoring part.

18. An axial elastic return spring for axially returning a brake pad of a disc brake from an active position to an inactive position, said spring being intended to be interposed between the brake pad and a fixed support, said spring comprising:

an elastic deformation portion, arranged to produce a reaction force during pressing of said pad in the active position, so as to return translationally said brake pad to the inactive position;
a carrier portion arranged to be fastened on the fixed support of the disc brake, and which is integral with the deformation portion;
a pad portion arranged to be fastened to the brake pad, in the form of a fastening tab, which is integral with the deformation portion and which extends in a plane orthogonal to the direction of axial sliding (A) of the brake pad;

the carrier portion including a support part having a first support section which:
is integral with the deformation portion;
extends in a plane orthogonal to the direction of axial sliding (A) of the brake pad; and
is arranged to press axially on the fixed support under the effect of the deformation of the spring when the brake pad leaves its inactive position, and the carrier portion comprises a connection part comprising at least one connection fold arranged and configured to press on an anchoring part carried by a transverse face of the fixed support, and cooperate with said anchoring part to prevent lifting of said connection part, the connection part comprises at least three connection sections:
a second lateral connection section, a proximal end of which is connected to the first support section by a first fold, a folding axis of which is orthogonal to the axial direction (A) of the displacement of the brake pad;
a third connection section, a proximal end of which is connected to the second section by a second fold, a folding axis of which is orthogonal to the axial direction (A) of the displacement of the brake pad;
a fourth lateral connection section comprising a distal end, and a proximal end connected to the third section by a third fold, a folding axis of which is orthogonal to the axial direction (A) of the displacement of the brake pad; and the at least second lateral connection, the third connection, and the fourth lateral connection sections and/or the first, second and third folds being arranged to substantially form a "U", in such a way that the connection part can fit on the anchoring part in the form of a peg, and thus prevent the lifting by a pinching of said peg, the connection part comprising a fifth connection section comprising a distal end configured as an overfolded loop, and a proximal end connected to the fourth section by a fourth fold, the folding axis of which is orthogonal to the axial direction (A) of the displacement of the brake pad, the fifth connection section extending in a direction opposite to the first support section, so as to produce a support tab capable of pressing on the pressing face of the fixed support.

19. An axial elastic return spring for axially returning a brake pad of a disc brake from an active position to an inactive position, said spring being intended to be interposed between the brake pad and a fixed support, said spring comprising:

an elastic deformation portion, arranged to produce a reaction force during pressing of said pad in the active position, so as to return translationally said brake pad to the inactive position;
a carrier portion arranged to be fastened on the fixed support of the disc brake, and which is integral with the deformation portion;
a pad portion arranged to be fastened to the brake pad, in the form of a fastening tab, which is integral with the deformation portion and which extends in a plane orthogonal to the direction of axial sliding (A) of the brake pad;

the carrier portion including a support part having a first support section which:
is integral with the deformation portion;
extends in a plane orthogonal to the direction of axial sliding (A) of the brake pad; and
is arranged to press axially on the fixed support under the effect of the deformation of the spring when the brake pad leaves its inactive position, and the carrier portion comprises a connection part comprising at least one connection fold arranged and configured to press on an anchoring part carried by a transverse face of the fixed support, and cooperate with said anchoring part to prevent lifting of said connection part, the connection part comprising a second connection section, a proximal end of which is connected to the first support section by at least one connection fold, a folding axis of which is orthogonal to the axial direction (A) of the displacement of the brake pad, the second section extending substantially parallel to the first support section so as to be able to be inserted under a projection of the anchoring part in the form of a peg, and thus prevent the lifting by an axial pressing applied under said projection, whereby when the brake pad leaves its inactive position, the first support section, during a displacement M1, is arranged to press axially on the fixed support with an axial pressing force T1 under the effect of the deformation of the spring, and the connection part is arranged to held the spring in position due to the pressing T2 under the projection of the anchoring part which thus opposes a lifting M2 of the connection part and by a lever effect around a radial direction passing through the support part, due to the axial pressing force T1, the elasticity of the spring thus exerts an axial lifting force T2, on the carrier, and an axial return force, TO, on the brake pad, to return the brake pad to the inactive position.

20. A method for mounting at least one axial elastic return spring, according to claim 19, on a fixed support for a brake caliper of a disc brake of a motor vehicle, said support having an anchoring part carried by a transverse face of said fixed support and comprising at least one projection projecting transversely, said projection being moulded in a single part with said fixed support, so as to be able to receive and cooperate with the carrier portion of the axial elastic return spring, comprising the steps consisting of:
- mounting a brake pad in or on a fixed support; and
- mounting said axial elastic return spring by transversely inserting the connection part of said spring under the projection of the anchoring part of the fixed support opposite the brake pad.

* * * * *